(12) United States Patent
Davis et al.

(10) Patent No.: US 11,298,680 B2
(45) Date of Patent: Apr. 12, 2022

(54) HIGH PERMEABILITY MEDIA MIX (HPMM) FOR PHOSPHOROUS AND NITROGEN REMOVAL FROM CONTAMINATED WATERS

(71) Applicants: UNIVERSITY OF MARYLAND, College Park, MD (US); PAVERGUIDE, INC., Worton, MD (US)

(72) Inventors: Allen P. Davis, Laurel, MD (US); Travis Ostrom, Springfield, VA (US); Charles White, Worton, MD (US)

(73) Assignees: UNIVERSITY OF MARYLAND, COLLEGE PARK, College Park, MD (US); PAVERGUIDE, INC., Worton, MD (US)

( * ) Notice: Subject to any disclaimer, the term of this patent is extended or adjusted under 35 U.S.C. 154(b) by 100 days.

(21) Appl. No.: 16/324,999

(22) PCT Filed: Aug. 14, 2017

(86) PCT No.: PCT/US2017/046834
§ 371 (c)(1),
(2) Date: Feb. 12, 2019

(87) PCT Pub. No.: WO2018/032019
PCT Pub. Date: Feb. 15, 2018

(65) Prior Publication Data
US 2019/0224646 A1   Jul. 25, 2019

Related U.S. Application Data

(60) Provisional application No. 62/374,583, filed on Aug. 12, 2016.

(51) Int. Cl.
*C02F 1/28* (2006.01)
*B01J 20/28* (2006.01)
(Continued)

(52) U.S. Cl.
CPC .......... *B01J 20/2803* (2013.01); *B01J 20/02* (2013.01); *B01J 20/041* (2013.01); *B01J 20/103* (2013.01);
(Continued)

(58) Field of Classification Search
None
See application file for complete search history.

(56) References Cited

U.S. PATENT DOCUMENTS

| | | | | |
|---|---|---|---|---|
| 5,580,770 A | * | 12/1996 | DeFilippi | C02F 3/10 435/180 |
| 7,294,275 B1 | * | 11/2007 | Sibrell | B01J 20/06 210/669 |

(Continued)

*Primary Examiner* — Matthew O Savage
(74) *Attorney, Agent, or Firm* — Whiteford, Taylor & Preston, LLP; Peter J. Davis

(57) ABSTRACT

A retention media for removing substances from water that includes an aggregate; at least one granular adsorbing material capable of adsorbing nutrients and metals; and a *psyllium*, wherein the *psyllium* performs as a binder to adhere the at least one granular adsorbing material to the aggregate to form a high permeability media mix is disclosed. A method of manufacturing a media mix is disclosed that includes creating a dry mixture of aggregate, at least one granular absorbing material, and a *psyllium*; and saturating the dry mixture with water to create a bond between the at least one granular absorbing material, and the aggregate via the *psyllium* thereby forming a high permeability media mix (HPMM). A method of using a media mix to reduce concentration of substances in water includes installing materials over granular adsorbing material, aggregate; and *psyllium* to reduce concentration of phosphorous or nitrogen or metals in the water.

15 Claims, 19 Drawing Sheets

(51) Int. Cl.
*B01J 20/12* (2006.01)
*B01J 20/20* (2006.01)
*B01J 20/10* (2006.01)
*B01J 20/02* (2006.01)
*B01J 20/18* (2006.01)
*B01J 20/04* (2006.01)
*B01J 20/30* (2006.01)
*C02F 101/10* (2006.01)
*C02F 101/16* (2006.01)
*C02F 103/00* (2006.01)
*C02F 101/20* (2006.01)

(52) U.S. Cl.
CPC ............... *B01J 20/12* (2013.01); *B01J 20/18* (2013.01); *B01J 20/20* (2013.01); *B01J 20/28016* (2013.01); *B01J 20/3028* (2013.01); *C02F 1/281* (2013.01); *C02F 1/288* (2013.01); B01J 2220/4875 (2013.01); B01J 2220/4887 (2013.01); C02F 1/283 (2013.01); C02F 2101/105 (2013.01); C02F 2101/16 (2013.01); C02F 2101/20 (2013.01); C02F 2103/001 (2013.01)

(56) References Cited

U.S. PATENT DOCUMENTS

| | | | | |
|---|---|---|---|---|
| 2010/0108617 A1* | 5/2010 | Schmidt | ............... | E03F 1/00 210/768 |
| 2011/0064872 A1* | 3/2011 | Riehm | ............... | E01C 5/003 427/136 |
| 2012/0219519 A1* | 8/2012 | McLaughlin | ............ | B09C 1/08 424/76.1 |

* cited by examiner

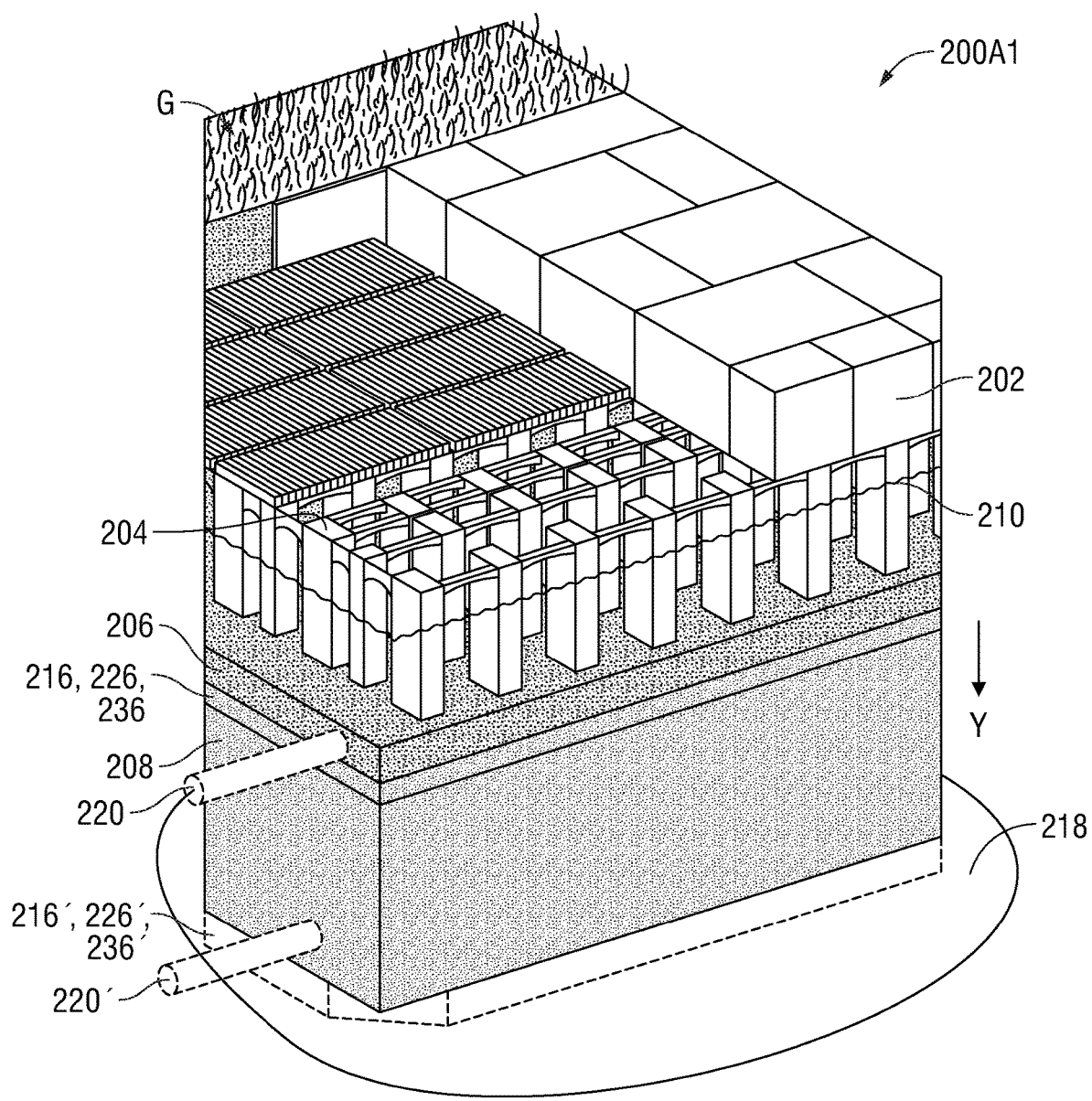
FIG. 2A1

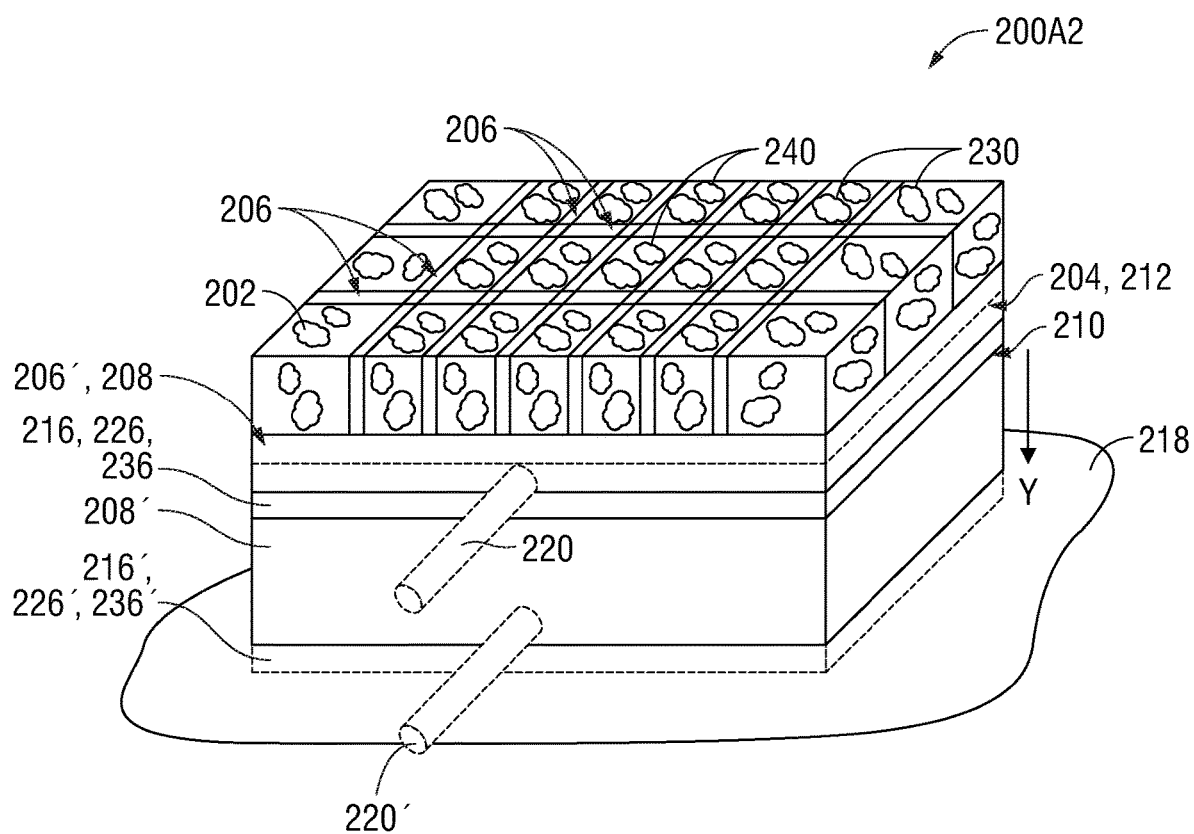
FIG. 2A2

COLUMNS - TEST RESULTS
- P adsorption capacity of HPMM was 1276 mg/kg at saturation with
- 0.17 mg/LP after > 300m of applied water
- 200 times capacity of control
- 90% P removal for 25 yr pavement design life

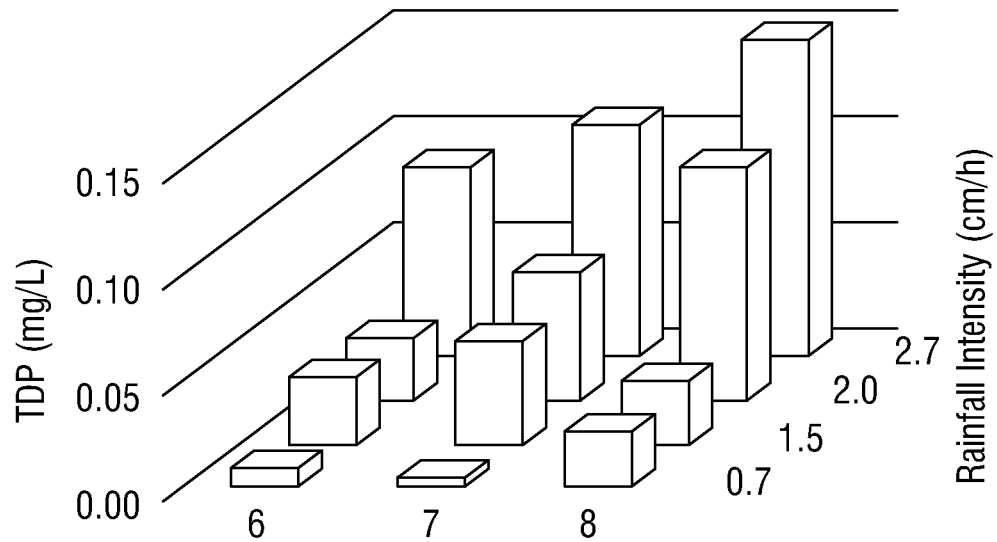
FIG. 6B1
ADSORPTION KINETICS
MESOCOSM - TEST RESULTS
- Effluent mean concentration (EMC) of TDP ranged 0.01 to 0.15 mg/LP
- P removal decreased at higher pH & rainfall intensity
- pH dependence supports P adsorption as removal mechanism
- EMCs were below 0.05 mg/LP for rainfall intensity below 1.50 cm/h, nearly double 1-yr storm in Maryland
FIG. 6B2

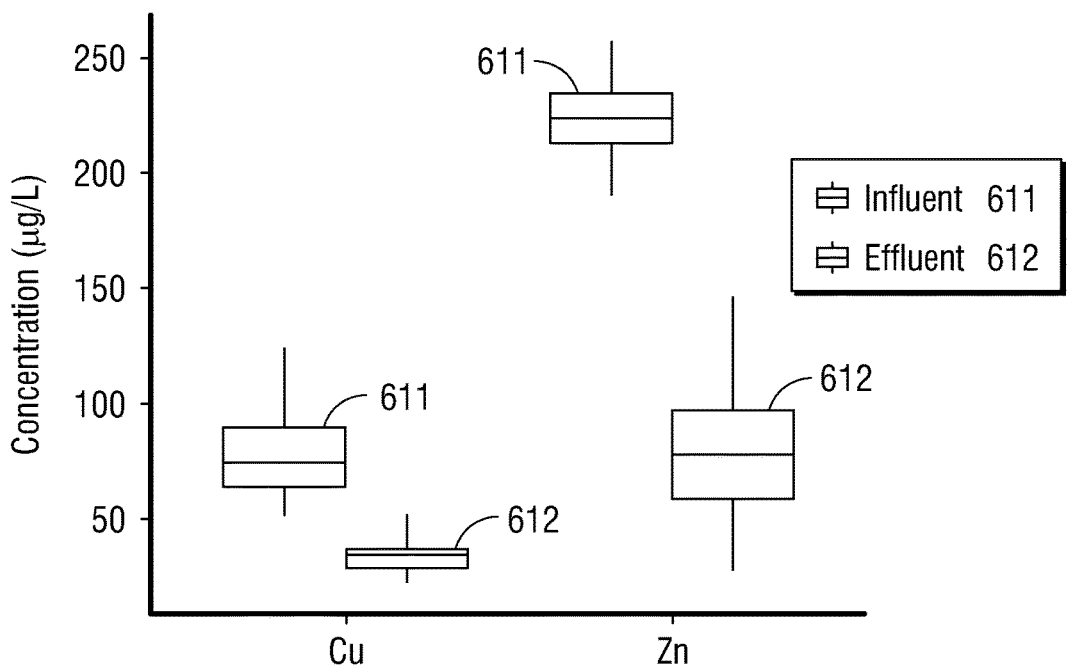

ADSORPTION KINETICS
MESOCOSM - TEST RESULTS

- HPMM also removed heavy metals, copper and zinc.

FIG. 6C

PHOSPHOROUS REMOVAL EQUATION MODEL

A steady state, plug flow model predicts P removal as a function of HPMM depth (d), intensity (I), and pH $$\frac{C}{C_0} = e^{-(1.0646-0.0927\text{pH})\frac{d}{I}}$$

Calibration of model:
FIG. 6D1 Modeled TDP Concentration C
vs. Measured TDP Concentration C (mg/L)

Model prediction:
FIG. 6D2 - Target Effluent P Concentration (mg/L) vs. Required media depth (cm)

FIG. 6D

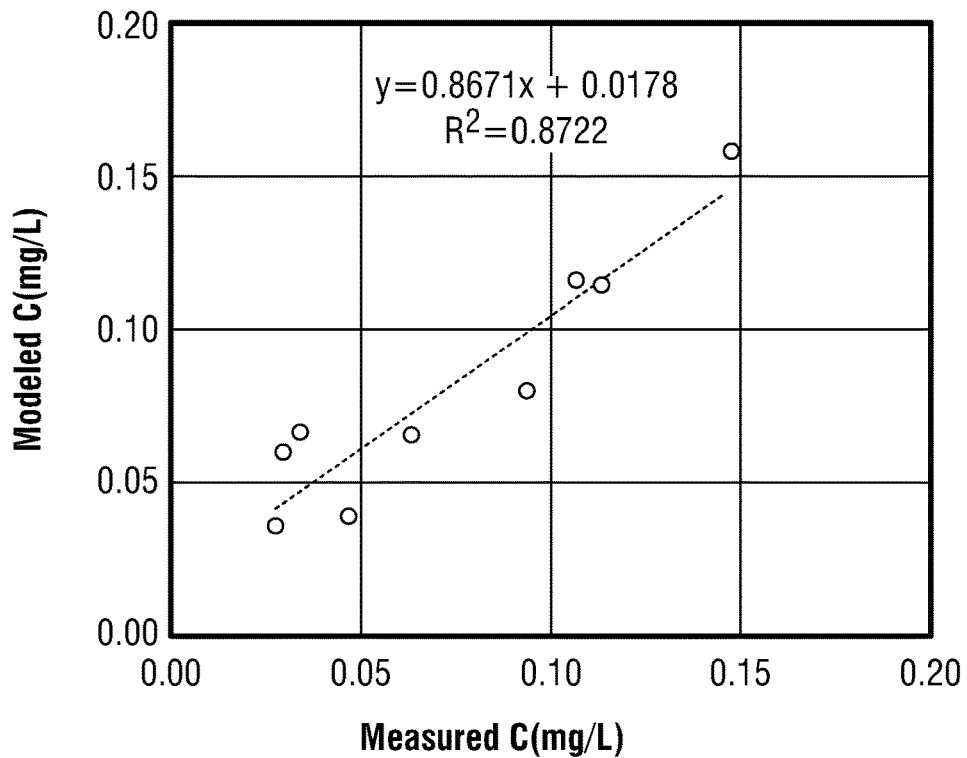
FIG. 6D1
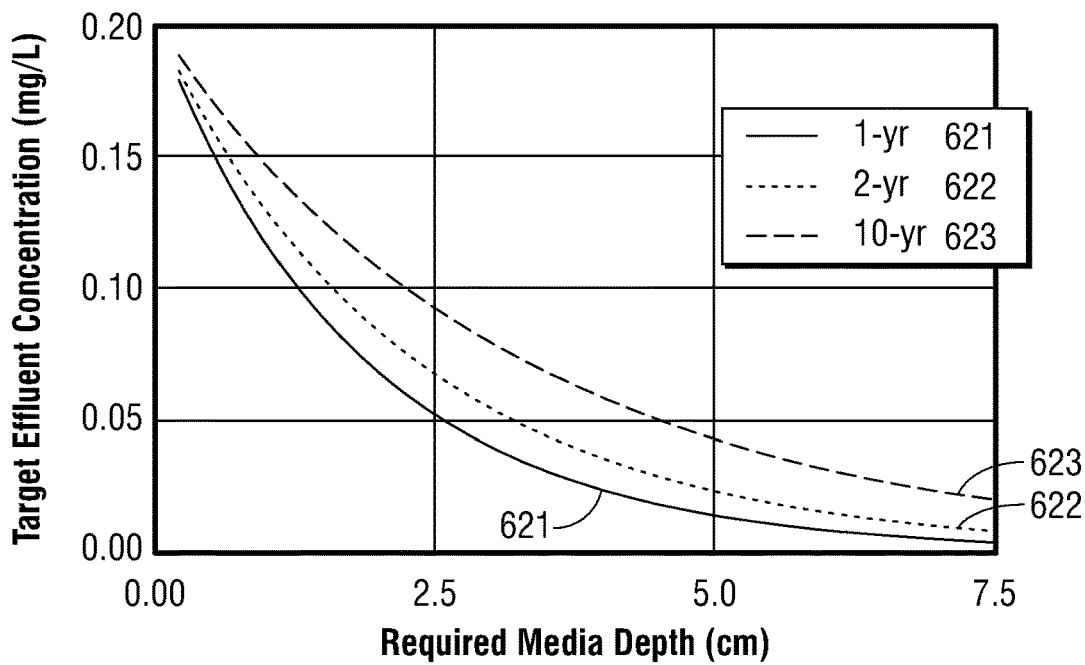
FIG. 6D2

HIGH PERMEABILITY MEDIA MIX (HPMM) FOR PHOSPHOROUS AND NITROGEN REMOVAL FROM CONTAMINATED WATERS

CROSS-REFERENCE TO RELATED APPLICATIONS

This application claims priority to, and the benefit of, U.S. Provisional Patent Application No. 62/374,583, filed on Aug. 12, 2016, entitled "High Permeability Media Mix for Phosphorous and Nitrogen Removal from Contaminated Waters", by Allen P. Davis et al., the entire contents of which are incorporated by reference herein.

BACKGROUND

1. Technical Field

The present disclosure relates to retention media and methods for treating effluent containing dissolved pollutants from stormwater or wastewater. More particularly, the present disclosure relates to retention media and methods for treating effluent such as those containing dissolved phosphorous and nitrogen from stormwater and other polluted wastewater effluent.

2. Discussion of Related Art

Many areas throughout the United States and other parts of the world have been experiencing large scale algae growth in bays and estuaries, leading to reductions in total dissolved oxygen and deaths of aquatic life as the algae decay. Nutrient loadings can lead to waterbody impairment. Urban runoff persists as a major nutrient pollution source. Permeable paving seeks to mitigate effects of runoff but is inadequate. Stone pavement base has low phosphorous, nitrogen and heavy metals adsorption capacity.

Consequently, in the United States, with the promulgation of the Chesapeake Bay TMDL (Total Maximum Daily Load), inputs of sediment, nitrogen (N), and phosphorus (P) to the Bay must be reduced throughout the entire Bay watershed. Agriculture, urban, and wastewater treatment discharges are all included in the TMDL regulations. A number of "green infrastructure" technologies (stormwater control measures, SCMs) are being employed in urbanized areas to reduce runoff and improve runoff water quality. These technologies include bioretention, swales, permeable pavements and green roofs. Nationally, many other watersheds are dealing with similar problems of excess N and P, along with increased urbanization pressures.

P is present in urban runoff in several different forms. The majority of P is affiliated with particulate matter and is known as particulate phosphorus (PP). The remainder is dissolved P (DP). The dissolved P can be further separated into organic P and phosphate. P concentrations in urban stormwater range from about 0.2 to 0.6 mg/L (Sample et al. 2012). High levels of P (and nitrogen) in natural waters can lead to excess algae growth, leading to reductions in water dissolved oxygen levels and death of aquatic life, as the algae decay.

PP is readily removed from stormwater runoff by SCMs because particulate matter is effectively filtered by SCM media. However, DP is more difficult to remove and typically requires some type of adsorption mechanism for capture. Also, captured PP can leach P as DP.

The primary concern of septic system effluent is nitrogen. A conventional septic tank allows solids to settle out, while the effluent drains through perforated underground pipes. If well-maintained, septic tanks remove bacteria and let wastewater filter back into the ground. But they do not remove dissolved nitrogen. Nitrogen compounds are fertilizer. When fertilizer flows into a waterbody, algae blooms.

Wastewater treatment plants are required to reduce phosphorous and nitrogen from the effluent.

SUMMARY

In view of the foregoing problems relating to stormwater runoff, the present disclosure relates to the development of a stormwater treatment media capable of long-term P retention in permeable paving applications.

A novel stormwater treatment media has been synthesized and demonstrated: structural and hydraulic properties sufficient for a permeable pavement base and effective phosphorus (P) removal under lab and mesocosm testing with synthetic stormwater.

The media can improve water quality in permeable paving.

The treatment effectiveness has been evaluated at the laboratory and mesocosm scales.

Accordingly, the embodiments of the present disclosure provide significant and non-obvious advantages over the prior art by relating to a retention media for removing substances from water that includes an aggregate; at least one granular adsorbing material capable of adsorbing nutrients and metals; and a *psyllium*, wherein the *psyllium* performs as a binder to adhere the at least one granular adsorbing material to the aggregate to form a high permeability media mix.

In an aspect, the at least one granular adsorbing material is selected from a water treatment residual (WTR), or zeolite, or activated carbon, or aluminum, or iron or lime.

In an aspect, the aggregate is selected from expanded shale, expanded clay, expanded slate, stone, zeolite, slag, sand, or combinations thereof.

In an aspect, content of the *psyllium* ranges from 0.8-1.2%.

In a further aspect, the content of the *psyllium* is 1%.

In an aspect, the aggregate is expanded shale, and the at least one granular absorbing material is aluminum.

In an aspect, the aggregate is expanded shale, the at least one granular adsorbing material is water treatment residual.

In a further aspect, the at least one granular adsorbing material includes activated carbon.

In another aspect, the at least one granular adsorbing material includes zeolite.

In an aspect, content of the WTR ranges from 5-15%.

In an aspect, the *psyllium* content ranges from 0.8-1.2%

In a further aspect, the content of the *psyllium* is 1%.

In an aspect, the at least one granular adsorbing material is a material having a chemical composition enabling the at least one granular adsorbing material to act through one of ligand exchange or ion exchange or hydrogen bonding or hydrophobic partitioning or combinations thereof.

In an aspect, the at least one granular adsorbing material is a material having a chemical composition enabling the at least one granular adsorbing material to remove from water one of phosphorous species or nitrogen species or heavy metals or combinations thereof.

The present disclosure relates also to a method of manufacturing a media mix that includes creating a dry mixture of aggregate, at least one granular absorbing material, and a

*psyllium*; and saturating the dry mixture with water to create a bond between the at least one granular absorbing material, and the aggregate via the *psyllium* thereby forming a high permeability media mix (HPMM).

In an aspect, the step of creating includes creating a dry mixture of the aggregate, at least one granular adsorbing material and the *psyllium* having a content of 0.8-1.2%.

In an aspect, the step of creating includes creating a dry mixture of aggregate, and 1-15% of at least one granular absorbing material, and *psyllium*.

In a further aspect, the step of creating includes creating a dry mixture of an expanded shale aggregate, and at least one adsorbing material with a content of 5-15% water treatment residual, and the *psyllium* having a content of 0.8-1.2%.

The present disclosure relates also to a method of using a media mix to reduce concentration of substances in water that includes providing a retention media that includes at least one granular absorbing material, aggregate; and *psyllium* wherein the *psyllium* performs as a binding agent to form a high permeability media mix (HPMM). The method also includes providing materials configured to form a surface exposed to meteorological events and installing the materials configured to form a surface exposed to meteorological events over the HPMM wherein the HPMM reduces the concentration of a substance selected from the group consisting of phosphorous or nitrogen or metals or combinations thereof in the water as the water passes through the HPMM.

In an aspect, the step of providing a retention media includes providing a retention media that includes at least one granular adsorbing material; aggregate; and 0.8-1.2% *psyllium* wherein the *psyllium* performs as a binding agent to form a high permeability media mix (HPMM).

In an aspect, the step of providing a retention media includes providing a retention media that includes 1-15% of at least one granular adsorbing material; expanded shale; and *psyllium* wherein the *psyllium* performs as a binding agent to form a high permeability media mix (HPMM).

The present disclosure relates also to a method of using a media mix to reduce content of substances in stormwater in an infiltration trench that includes providing a retention media that includes at least one granular adsorbing material; aggregate; and *psyllium* wherein the *psyllium* performs as a binding agent to form a high permeability media mix (HPMM). The method also includes providing a permeable surface material configured to form a surface exposed to meteorological events; and installing the permeable surface material over the HPMM wherein the HPMM reduces the concentration of a substance selected from the group of phosphorous or nitrogen or metals or combinations thereof in the stormwater as the stormwater passes through the HPMM.

In an aspect, the step of providing a retention media includes providing a retention media that includes at least one granular adsorbing material; aggregate; and 0.8-1.2% *psyllium* wherein the *psyllium* performs as a binding agent to form a high permeability media mix (HPMM).

BRIEF DESCRIPTION OF THE DRAWINGS

The above-mentioned advantages and other advantages will become more apparent from the following detailed description of the various exemplary embodiments of the present disclosure with reference to the drawings wherein:

FIG. 2A1 is an installation diagram for one method of installing or using the HPMM according to embodiments of the present disclosure wherein a plurality of permeable pavers and a structural module are installed over the HPMM or an optional layer of aggregate is shown below the HPMM, and optional locations are shown for a permeable geotextile filter fabric, a geogrid, an impermeable liner and drain pipe;

FIG. 2A2 is an installation diagram for another method of installing or using the HPMM according to embodiments of the present disclosure wherein the HPMM or stone is interspersed within a gravel paver and the gravel paver is installed over the HPMM and the HPMM is installed over an impermeable liner with a drain pipe or over a layer of aggregate resting on an impermeable liner with a drain pipe or alternately a permeable geotextile filter fabric or a geogrid for structural support can be placed at various elevations;

FIG. 6B1 is a graphical plot of TDP versos pH for three different mesocosm rainfall event levels;

FIG. 6B2 is a tabular listing of the adsorption kinetics test results from the mesocosm testing;

FIG. 6C is a graphical plot of adsorption kinetics test mesocosm test results for copper and zinc;

FIG. 6D is a tabular illustration of the phosphorous removal equation model;

FIG. 6D1 is a graphical plot of modeled P concentration versus measured P concentration for the mesocosm testing;

FIG. 6D2 is a graphical plot of target effluent P concentration versus required media depth for 1 year, 2 year and 10 year durations for the mesocosm testing.

DETAILED DESCRIPTION

Figure 1A:
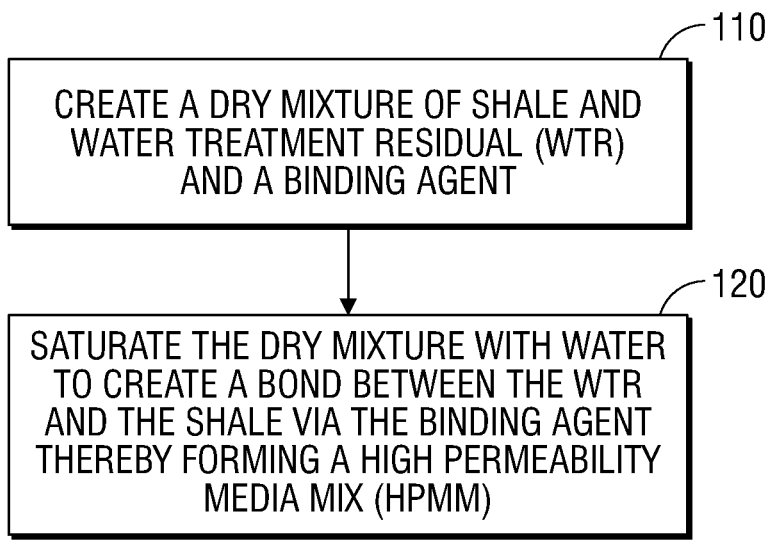
FIG. 1A is a method step diagram illustrating a generic method of manufacturing a high permeability media mix (HPMM) according to embodiments of the present disclosure.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

The word "exemplary" is used herein to mean "serving as an example, instance, or illustration." Any embodiment described herein as "exemplary" is not necessarily to be construed as preferred or advantageous over other embodiments.

It is to be understood that the method steps described herein need not necessarily be performed in the order as described. Further, words such as "thereafter," "then," "next," etc., are not intended to limit the order of the steps. Such words are simply used to guide the reader through the description of the method steps.

The address the effects of and prevent algae bloom described above, the present disclosure relates to a high permeability media mix (HPMM) that is formed or developed by combining WTR with a porous structural material and a binding agent. Methods of manufacturing and using the HPMM are also disclosed.

More particularly, the HPMM is a synthesized retention media mixture for use in removing contaminants in stormwater runoff or other remediation or wastewater treatment applications. The retention media mixture may be used in stormwater Best Management Practices (BMP's) to reduce nutrient and metals pollution of groundwater and surface water. The retention media mixture may provide nutrient and metals reduction benefits to BMP's such as permeable paving, infiltration trenches, submerged gravel wetlands, bioretention, rain gardens, manufactured treatment devices, sand filters, and green roofs. The retention media mixture may be used in wastewater applications such as septic system leach fields and septic system filters, and in alternative systems that may include elevated sand mounds, at-grade systems, shallow placed pressure dosing systems, recirculating sand filters, and constructed wetlands. The retention media may be used as a replacement for expanded shale, or in combination with expanded shale to improve removal performance at wastewater treatment facilities where expanded shale is currently used to provide nutrient and metals reductions.

HPMM may include expanded shale (shale) in combination with aluminum-based water treatment residual (WTR) bound together with a *psyllium*-based soil stabilizer (*psyllium*). Although expanded shale of ⅜" (9.51 mm) size has been used with dried and powdered WTR, the novel features of the present disclosure include application of WTR and/or other adsorption materials in a mixture with expanded shale or other aggregates bound using powdered *psyllium* as a binding agent for water treatment. Binding by the *psyllium* of the WTR or other adsorbing materials to an aggregate (expanded shale, expanded clay, expanded slate, zeolite, slag, sand, stone, etc). enables application of the HPMM without a structure (concrete vault, etc.), to contain the retention media as a structural sub base in a pavement, or in an infiltration trench. If not bound by the *psyllium* the WTR and other adsorbing materials would erode due to the flow of stormwater or wastewater or its small size would prevent the flow of stormwater or wastewater through it.

The WTR may contain the adsorbing materials: aluminum, iron, zeolite, lime, and activated carbon. Alternately these adsorbing materials may be added in a granular form with the WTR or they may be used as part of the retention media without WTR. The adsorbing materials act through a plurality of physicochemical mechanisms, including ligand exchange, ion exchange, hydrogen bonding, and/or hydrophobic partitioning to remove phosphorous, nitrogen species, and heavy metals.

Zeolite may be a component of the WTR but it may also be used as the aggregate or in combination with other aggregates such as expanded shale, expanded clay, or crushed stone. Alternately, a powdered form of zeolite may be blended into the media mixture. Activated carbon may be a component of the WTR or a powdered form may be blended into the media mixture.

Method of Manufacturing:

A method of manufacturing the high permeability media mix (HPMM) includes combining WTR and/or other granular adsorbing materials with an aggregate and a binding agent of *psyllium*. Although usage of other binding agents is within the scope of the present disclosure, assuming an annual rainfall of 100 cm per year, the HPMM mixture according to embodiments of the present disclosure is predicted to last over 600 years as a permeable pavement sub-base before reaching P saturation at this influent concentration. This is a substantial improvement over the 6-year lifetime predicted using expanded shale alone and enables a long period of use before replacement is needed.

The retention media is made by dry-mixing expanded shale with 5-15% WTR and *psyllium* ranging from 0,8-1.2% or approximately 1% *psyllium*, by total oven-dry mass. Alternately the retention media using granular adsorbing materials in lieu of, or in addition to WTR may include 1-15% adsorbing material. After mixing, the material is saturated with water to create the *psyllium* bond between the WTR and/or granular absorbing material and expanded shale.

Media Preparation

The retention media is prepared by mixing dry expanded shale with 5-15% WTR and approximately 1% *psyllium*, by total dry mass. Alternately other aggregates may be used and other granular absorbing materials may be used independently, or with WTR. Mixing can be done by hand, for example using a scoop or shovel, or mechanically, for example using a concrete mixer or larger industrial aggregate mixer. A small amount of water, enough to just moisten the media, may be added during mixing to encourage binding between the powdered and/or granular materials and the aggregate components. This can discourage separation during subsequent transport and handling. After setting it in place, more water should be sprayed on the retention media to achieve approximately 10% moisture content and to complete the binding process. Thus, the material is saturated with water to create the *psyllium* bond between the WTR and/or granular adsorbing material and expanded shale and/or other aggregates.

The HPMM may additionally include as an option, a solid organic material such as a biochar, wood chips, or other organic material so as to treat other pollutants. This material would act as a long-term supply of organic carbon and a support media for bacteria and other organisms that can bio-transform nitrogen in stormwater and wastewater. The media would have a high surface area and release low levels of dissolved carbon. The primary application would be for use under anoxic conditions for denitrification. However, use under other conditions may also occur.

This unique combination of inexpensive and waste materials results in an affordable water treatment solution.

WTR is a waste material generated during drinking water treatment through the process of coagulation using alum (aluminum sulfate) addition. Previous research has demonstrated the capacity of WTR for removing dissolved pollutants, particularly phosphorus (P), in a variety of contexts (Ippolito et al. 2011). Amorphous aluminum (hydr)oxides in WTR adsorb phosphate ($PO_4^{3-}$) anions through ligand exchange in which phosphates form strongly bound complexes with the positively charged aluminum (hydr)oxides at the surface (Stumm and Morgan 1996). Poly aluminum chloride may alternately be used as a coagulant in lieu of alum and reside in the WTR. Lime, zeolite, activated carbon, and iron are also used as coagulants and may be in WTR.

*Psyllium* husk powder is a fibrous substance produced from the seeds of the *Plantago ovata* plant. It is used in a number of commercially available products including fiber supplements, laxatives, and soil binders due to the fact that moistening the powder creates a gluey substance. Stabilizer soil binder (Stabilizer Solutions, Phoenix, Ariz.) has been used in this application.

The expanded shale used in this mixture is a lightweight, clay-based aggregate with an irregular and angular surface. The irregular surface of expanded shale has been shown to support microbial attachment and growth and thus may enhance nitrogen (N) removal (Calheiros et al. 2009). Expanded shale also confers structural capacity to the mixture and enables it to be used as a load-bearing aggregate. Additionally, it serves as a matrix to physically support the powdered WTR and/or the granular adsorbing material. When combined with the *psyllium* binder, the result is essentially a WTR-coated aggregate. This prevents washout of powdered WTR and/or other granular adsorbing material and expands applicability of WTR and/or other granular adsorbing material to situations where a powdered or clay-like material would be inappropriate (e.g., high flow treatment applications and permeable pavement base).

In view of the foregoing, FIG. 1A is a method step diagram illustrating a generic method 100 of manufacturing the high permeability media mix (HPMM) according to embodiments of the present disclosure. More particularly, step 110 includes creating a dry mixture of expanded shale and water treatment residual (WTR) and a binding agent (*psyllium*). Alternately other aggregates, WTR with or without other granular adsorbing material, or granular adsorbing material alone, with *psyllium* as a binding agent may be used.

Step 120 includes saturating the dry mixture with water to create a bond between the WTR and/or other adsorbing material if used and the expanded shale or other aggregate, if used via the binding agent *psyllium* thereby forming a high permeability media mix (HPMM).'

Figure 1B:
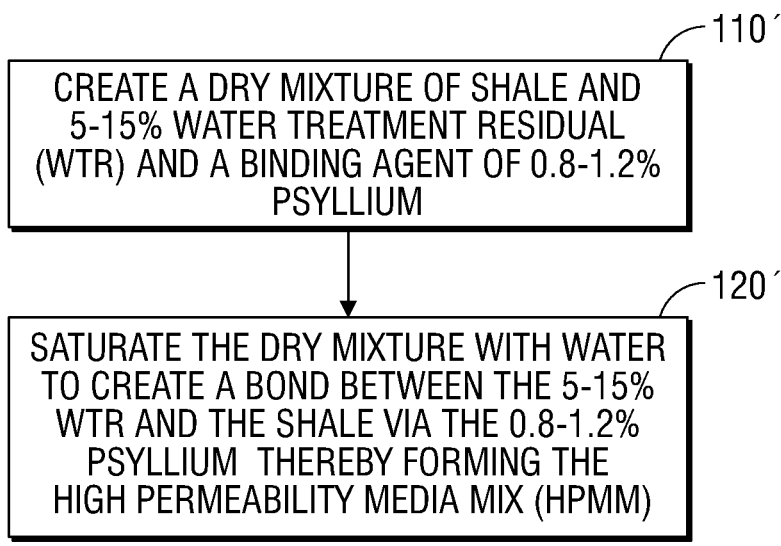
FIG. 1B is a method step diagram illustrating a specific method of manufacturing the HPMM according to embodiments of the present disclosure.

FIG. 1B is a method step diagram illustrating a specific method 100' of manufacturing the HPMM according to embodiments of the present disclosure. More particularly, step 110' includes creating a dry mixture of expanded shale or other aggregates and 5-15% water treatment residual (WTR) and/or other adsorbing material and a binding agent of 0.8-1.2% *psyllium*. Alternately 1-15% of granular absorbing material may be used with the aggregate and *psyllium*.

Step 120' includes saturating the dry mixture with water to create a bond between the 5-15% WTR and/or other adsorbing material and the expanded shale or other aggregates via the binding agent of 0.8-1.2% *psyllium* thereby forming a high permeability media mix (HPMM).

Figure 1C:
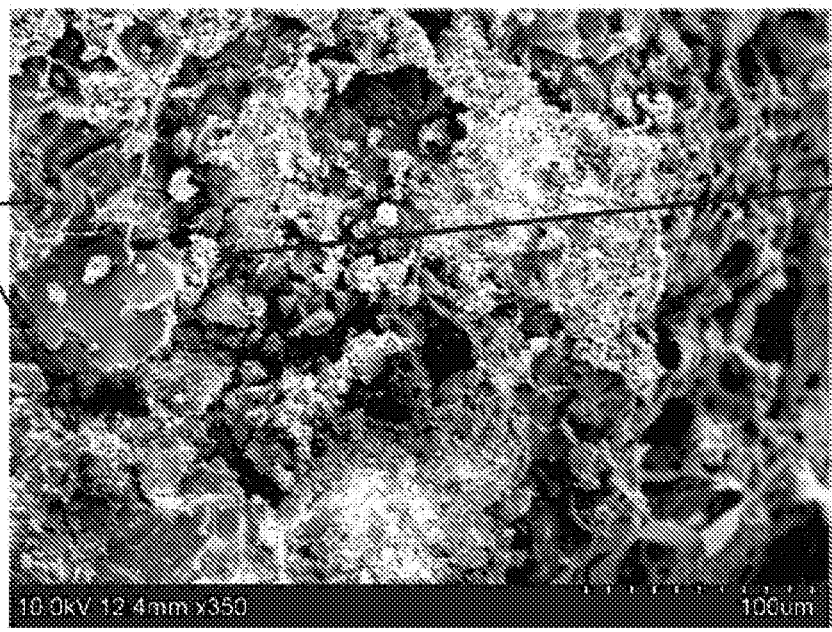
FIG. 1C is an electron micrograph of the HPMM according to embodiments of the present disclosure.

FIG. 1C is an electron micrograph 130 of the HPMM 206 according to embodiments of the present disclosure. The micrograph at a scale of 100 μm shows small particles of water treatment 2061 residual (WTR) attached to and supported by the shale.

The overall micrograph shows the HPMM. The smaller particles are the WTR 2061.

The micrograph shows clearly that the WTR is supported by the shale in the HPMM. The WTR forms a rough coating over the shale.

Accordingly, the present disclosure relates also to a composition of matter that includes water treatment residual (WTR), expanded shale and *psyllium* as a binding agent to form a high permeability media mix. An alternate composition of matter includes WTR and/or other granular adsorbing material, aggregate, and *psyllium* as a binding agent.

In one aspect of the present disclosure, the composition of matter includes 5-15% water treatment residual (WTR), shale and 0.8-1.2% *psyllium* as the binding agent to form the high permeability media mix. An alternate composition of matter includes granular adsorbing material, aggregate, and *psyllium*. Another alternate composition of matter includes WTR and other granular adsorbing material, and *psyllium*.

As defined herein, usage of terminology such as "installed over" or "positioned over" or "disposed over" or similarly "installed under" or "positioned under" or "disposed under" does not necessarily require direct contact between one structure or material as there may also be intervening structures or materials installed therebetween and such terminology is intended to refer to a structure or material at a higher elevation that at least partially overlaps another structure or material at a lower elevation.

FIG. 2A1 is an installation diagram for one method 200A1 of installing or using the HPMM according to embodiments of the present disclosure wherein a plurality of permeable pavers 202 and a structural module 204 are installed over the HPMM 206. Stormwater 210 enters through joint openings between the permeable pavers 202, passes through the structural module 204 and HPMM 206 where nutrients and metals are adsorbed and then infiltrates into the supporting surface 218 if it is permeable, such as soil. More particularly, permeable pavers 202, e.g., bricks, are installed adjacent to a grassy area G and are installed over a structural module 204. The structural model 204 is further installed over a layer of HPMM 206. The structural module 204 as defined herein refers to PaverGuide™ (available from PaverGuide, Inc., Worton, Md., USA) which includes a base for primary water storage and a grate that provides a rigid deck with openings which connect to the base and supports the plurality of permeable pavers 202. Other examples or types of structural modules or permeable surfaces configured to form a surface exposed to meteorological events as defined herein may include permeable concrete, a porous asphalt surface, an artificial turf, a gravel paver, a grass paver, and a permeable rubber surface.

An optional layer of aggregate is shown below the HPMM. and optional locations are shown for a permeable geotextile filter fabric 226', a geogrid 236', an impermeable liner 216' and drain pipe 220'.

In one aspect of the present disclosure, the layer of HPMM 206 may further be installed over an impermeable liner 216 or over a layer of aggregate 208 resting on the impermeable liner 216'. In either case, a pipe 220 or 220' is installed as a drain pipe to divert the stormwater that has been filtered by the HPMM 206 and may be directed to an outfall leading to a waterbody, a stormwater pond, or tank for reuse.

In a further aspect of the present disclosure, the layer of HPMM 206 may further be installed over a permeable geotextile filter fabric 226 or a geogrid 236 in place of the impermeable liner 216. Alternately, a layer of aggregate 208 may be installed between the permeable geotextile filter fabric 226' or geogrid 236' and the HPMM 206. Pipe 220 or 220' may be, if desired, installed as an underdrain for use with the permeable geotextile filter fabric 226 or 226' or geogrid or 236 or 236'.

The HPMM 206 may be installed directly over aggregate 208 or, as indicated above, the impermeable liner 216 or the permeable geotextile filter fabric 226 or geogrid 236 may be installed under the HPMM 206 and directly over the aggregate 208.

When the HPMM 206 is installed directly over aggregate 208, an impermeable liner 216' may be installed at a lower elevation in the aggregate 208 and further pipe 220' is installed again as an underdrain to divert the stormwater at level 210 that has been filtered by the HPMM 206, and which percolates through the aggregate 208, the stormwater is diverted to an outfall leading to a waterbody, to a stormwater pond, or to a tank for reuse.

In another aspect of the present disclosure, a permeable geotextile filter fabric 226' or a geogrid 236' may be installed at a lower elevation under Pipe 220' may be installed at the lower elevation again to divert the stormwater that has been filtered by the HPMM 206, and which percolates through the aggregate 208, and which may be diverted to the locations described above.

In either case, additional amounts of HPPM 206 may be used above, and/or around the underdrain pipes 220 or 220'.

Impermeable liner 216 or 216' would not generally be used at the same project location as permeable geotextile filter fabric 226 or 226', but impermeable liner 216 and permeable geotextile filter fabric 226 and impermeable liner 216' and permeable geotextile filter fabric 226° may be located at the same elevations when used. The locations of filter fabric 226, 226' and geogrid 236, 236° are shown for reference but may differ from the elevations shown in the drawings.

Geogrid 236 or 236' may be installed at the same project but at a different elevation from impermeable liner 216 or permeable filter fabric 226 or 226'.

The aggregate 208, or the HPMM 206, or the impermeable liner 216,' or filter fabric 226' or geogrid 236' may be installed over a supporting surface 218 that may include a soil sub grade, a rooftop, a slab, or any other surface suitable for supplying support.

Water level 210 is shown draining downwardly through HPMM 206 towards the supporting surface 218 in the direction of arrow Y.

FIG. 2A2 is an installation diagram for another method 200A2 of installing or using the HPMM according to embodiments of the present disclosure wherein HPMM 206 or stone 240 is interspersed within a gravel paver 240 (or the plurality of gravel pavers 240) and the gravel paver 240 may be installed over a layer of aggregate 208 when HPMM 206 is interspersed within the gravel paver 240 or is installed over a layer of HPMM 206' when stone 240 is interspersed within the gravel paver 240. and the HPMM is installed over an impermeable liner with a drain pipe or over a layer of aggregate 208 resting on an impermeable liner 216 with a drain pipe 220. Alternately a permeable geotextile filter fabric or a geogrid for structural support can be placed at various elevations.

As defined herein, gravel paver 240 includes permeable gravel pavers made by TrueGrid Pavers, (Pleasant Hill, Calif., USA).

The aggregate 208 or the layer of HPMM 206 is installed over structural module 204 as described above in FIG. 2A1 or optionally over load support grid 212 which is filled with stone 240 or HPMM 206

The structural module 204 or the load support grid 212 may then be installed directly over impermeable liner 216 or permeable geotextile filter fabric 226 or geogrid 236, or alternatively directly over a lower layer of aggregate 208' which is installed directly over impermeable liner 216', or permeable geotextile filter fabric 226', or geogrid 236' and the option of placing a drain pipe 220' above the liner, filter fabric, or geogrid or 220' over supporting surface 218 as described above with respect to FIG. 2A1.

Figure 2B:
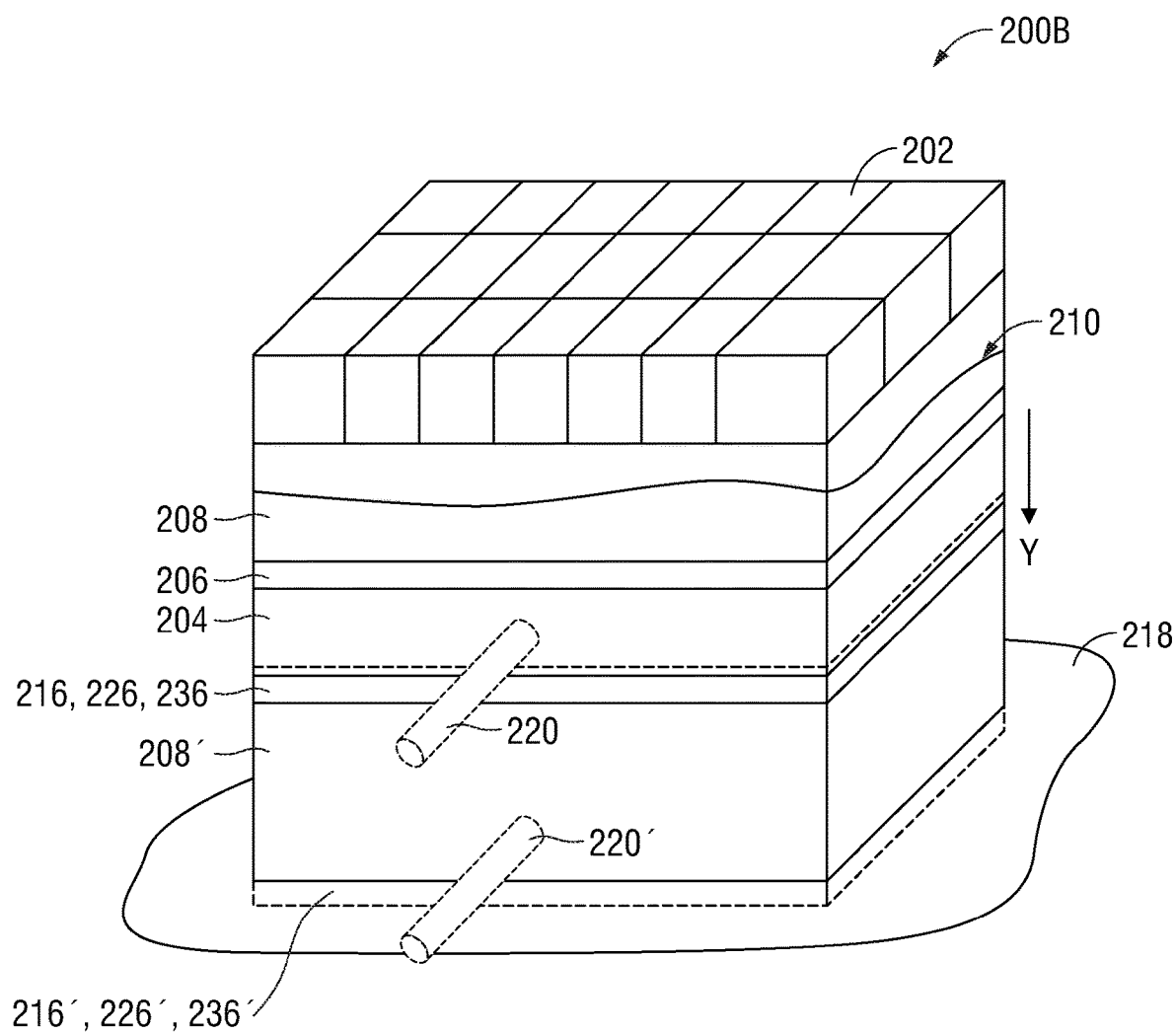
FIG. 2B is an installation diagram for still another method of installing or using the HPMM according to embodiments of the present disclosure wherein a permeable pavers or alternate permeable surfaces and aggregate are installed over the HPMM and the HPMM is installed over a structural module resting on a layer of aggregate with the options of an impermeable liner, or geogrid, or permeable geotextile filter fabric resting on a supporting surface and the option of placing a drain pipe above the liner, geogrid, permeable geotextile filter fabric, or supporting surface.

FIG. 2B is an installation diagram for still another method 200B of installing or using the HPMM 206 according to embodiments of the present disclosure wherein a plurality of permeable pavers 202 and aggregate 208 are installed over the HPMM 206 and the HPMM 206 is installed over a structural module 204 and/or aggregate 208, or a supporting surface 218 resting on a layer of aggregate 208 with the options of an impermeable liner 216, or geogrid 236, or permeable geotextile filter fabric 226 resting on a supporting surface 218 and the option of placing a drain pipe 220 above the liner, geogrid, filter fabric, or supporting surface.

More particularly, a permeable surface such as pavers 202 are installed or positioned or disposed over a layer of HPMM 206. Alternatively, the permeable surface such as pavers 202 may be installed over a layer of aggregate 208. In turn, the layer of HPMM 206 may be installed over a structural module 204 or alternatively directly over a lower elevation level layer of aggregate 208'. Additionally, the HPMM 206 and intervening structures or materials under the HPMM 206 may be installed over a supporting surface 218. Further, in a similar manner as described above with respect to FIGS. 2A1 and 2A2, impermeable liner 216 or the permeable geotextile filter fabric 226 or geogrid 236 and drain pipe 220 may be installed under the HPMM 206 or the structural module 204. Similarly, impermeable liner 216' or the permeable geotextile filter fabric 226' or geogrid 236' and drain pipe 220' may be installed under the HPMM 206 and under the lower level of aggregate 208' and immediately above the supporting surface 218. Again, stormwater shown at level 210 drains vertically downward in the direction of arrow Y.

Figure 2C:
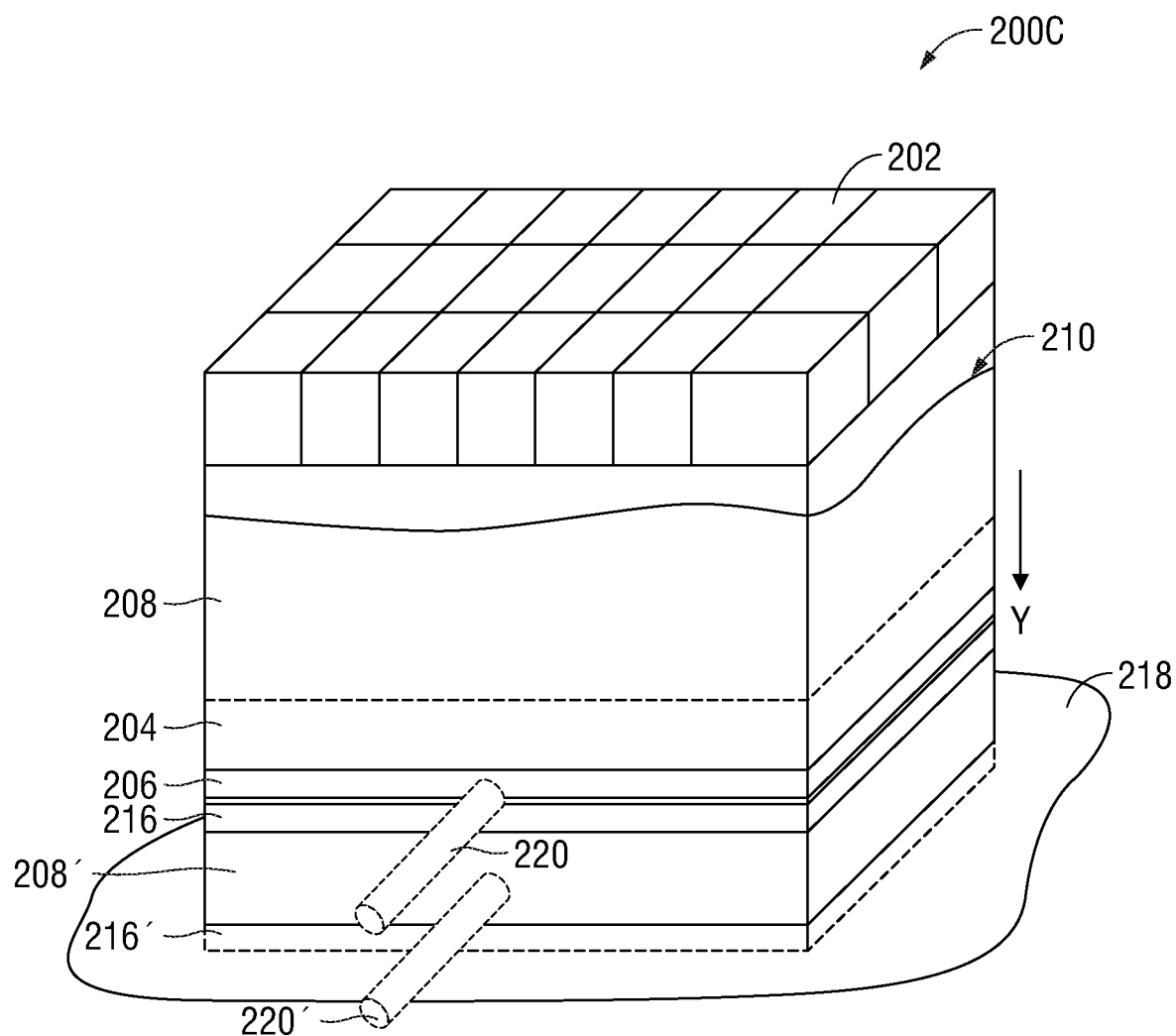
FIG. 2C is an installation diagram for yet another method of installing or using the HPMM according to embodiments of the present disclosure wherein the permeable pavers or alternate permeable surfaces and aggregate are installed over a structural module and the structural module is installed over the HPPM and the HPMM may rest on a supporting surface, or an impermeable liner with a drain pipe above the liner, or a layer of aggregate on the supporting surface which may include an impermeable liner resting on the supporting surface and a drain pipe above the impermeable liner.

FIG. 2C is an installation diagram for yet another method 200C of installing or using the HPMM according to embodiments of the present disclosure wherein the pavers 202 or alternate permeable surfaces are installed over aggregate 208 and the permeable surface 202 and the aggregate 208 are installed over a structural module 204 and the structural module 204 is installed over the HPPM 206. The HPPM 206 may again be installed over supporting surface 218 and intervening materials such as impermeable liner 216 or the permeable geotextile filter fabric 226 or geogrid 236 and drain pipe 220 may be installed under the HPMM 206 or the structural module 204 or at the elevation of the structural module 204. Similarly, impermeable liner 216' or the permeable geotextile filter fabric 226' or geogrid 236' and drain pipe 220' may be installed under the HPMM 206 and under the lower level of aggregate 208' and immediately above the supporting surface 218. Again, stormwater shown at level 210 drains vertically downward in the direction of arrow Y.

Figure 2D:
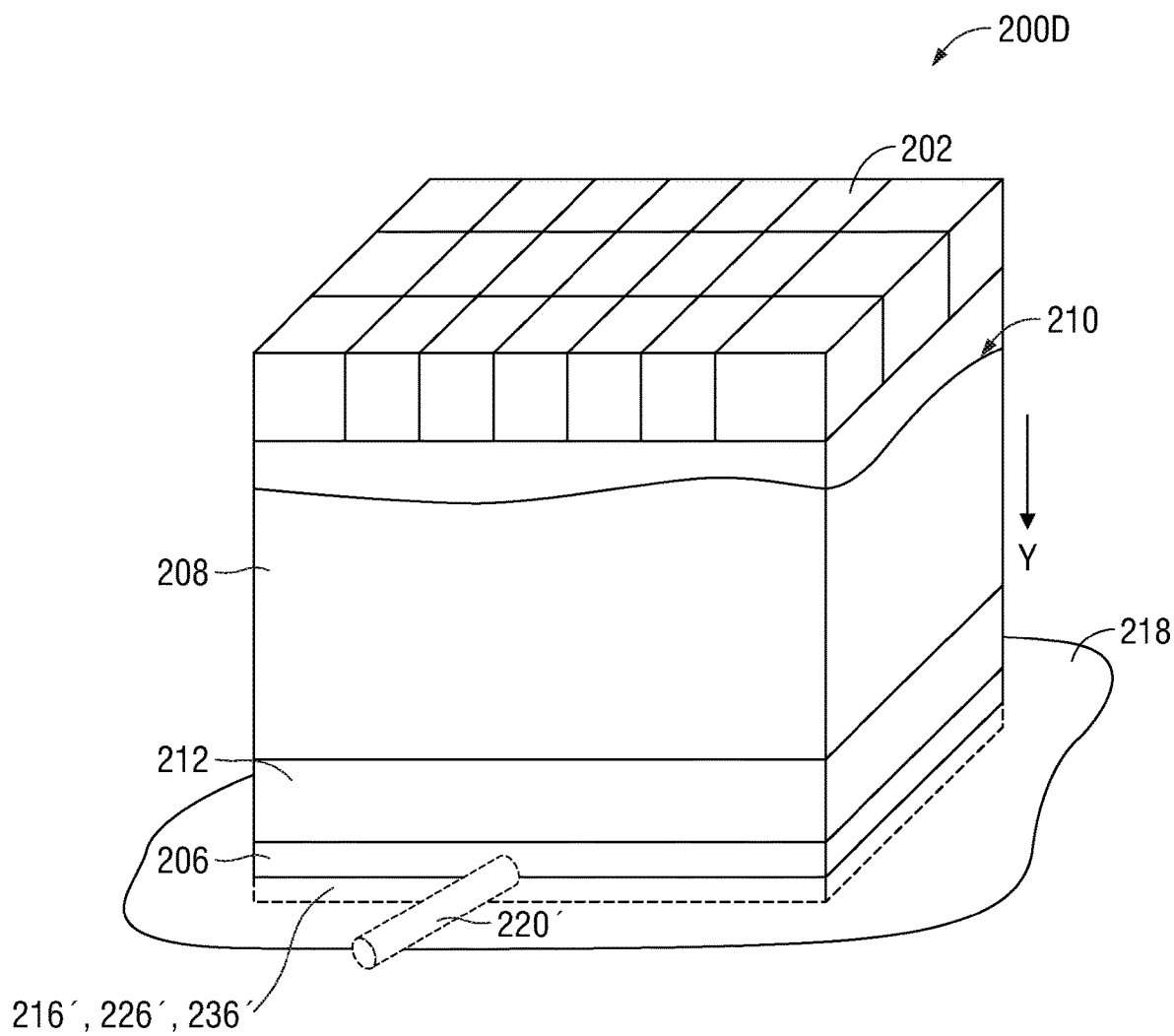
FIG. 2D is an installation diagram for another method of installing or using the HPMM according to embodiments of the present disclosure wherein permeable pavers or an alternate permeable surface and aggregate are installed over a load support grid and the load support grid is installed over the HPPM such that the HPMM is over a drain pipe or a permeable geotextile filter fabric or a geogrid or an impermeable liner with a drain pipe above the liner.

FIG. 2D is an installation diagram for another method 200D of installing or using the HPMM 206 according to embodiments of the present disclosure wherein pavers 202 are installed over aggregate 208 and the pavers 202 and aggregate 208 are installed over a load support grid 212 and the load support grid 212 is installed over the HPPM 206 and over a supporting surface 218. In a similar manner as described above, impermeable liner 216' or the permeable geotextile filter fabric 226' or geogrid 236' and drain pipe 220' may be installed under the HPMM 206 and under the aggregate 208 and immediately above the supporting surface 218. Again, stormwater shown at level 210 drains vertically downward in the direction of arrow Y and through the pipe 220'.

Figure 2E:
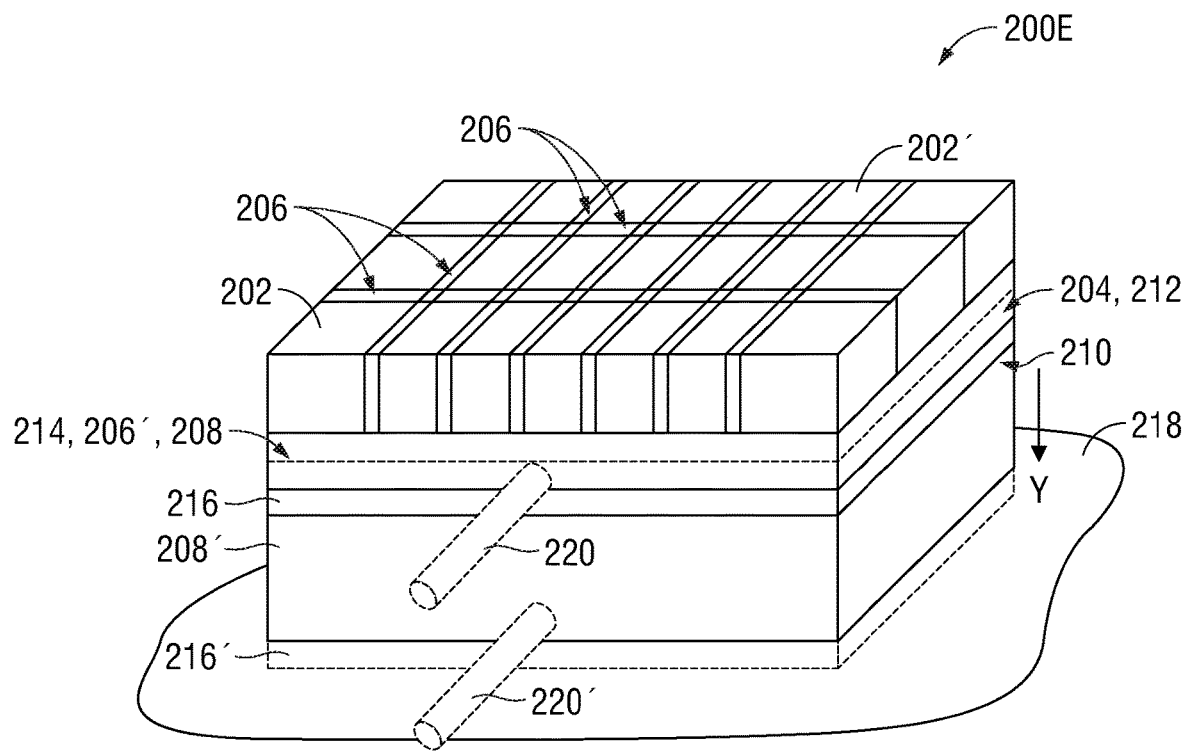
FIG. 2E is an installation diagram for another method of installing or using the HPMM according to embodiments of the present disclosure wherein HPMM is interspersed between pavers and a layer of HPMM may be over a structural module or within a load support grid over a layer of aggregate with an optional drain pipe, the aggregate resting on a supporting surface or optionally on an impermeable liner resting on a supporting surface with a drain pipe above the liner.

FIG. 2E is an installation diagram for another method 200E of installing or using the HPMM according to embodiments of the present disclosure wherein HPMM 206 is interspersed between pavers 202' and over an upper layer of aggregate 208 and a layer of HPMM 206' may be over a structural module 204 or HPMM may be interspersed (not shown) within a load support grid 212. The pavers 202' and interspersed HPMM 206 and the layer of HPMM 206 and the structural module 204 or the load support grid 212 are installed over a lower level of aggregate 208'.

The layer of HPPM 206 may again be installed over supporting surface 218 and intervening materials such as impermeable liner 216 or the permeable geotextile filter fabric 226 or geogrid 236 and drain pipe 220 may be installed under the structural module 204 or the load support grid 212. Similarly, impermeable liner 216' or the filter fabric 226' or geogrid 236' and drain pipe 220' may be installed under the HPMM 206 and under the lower level of aggregate 208' and immediately above the supporting surface 218. Again, stormwater shown at level 210 drains vertically downward in the direction of arrow Y.

Figure 2F:
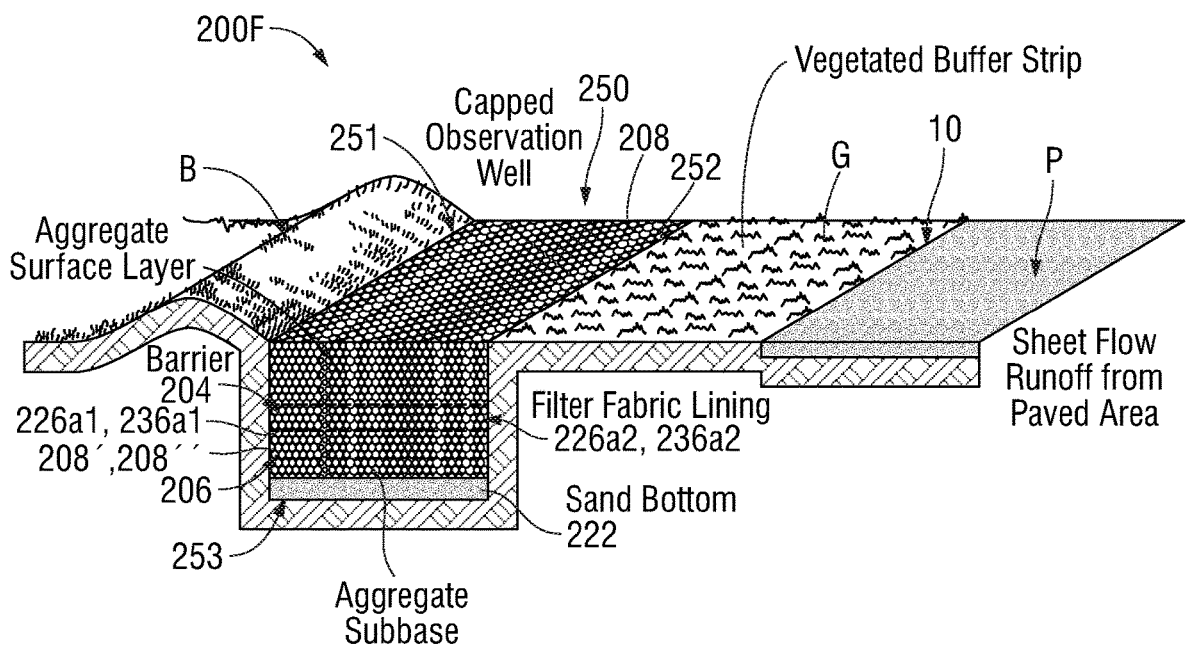
FIG. 2F is an installation diagram for another method of installing or using the HPMM according to embodiments of the present disclosure wherein a geotextile FABRIC is installed vertically on the sides of a trench and aggregate is installed over a horizontal arranged layer of HPMM installed over a layer of aggregate or a plurality of layers of aggregates.

FIG. 2F is an installation diagram for another method 200F of installing or using the HPMM according to embodiments of the present disclosure wherein a geotextile fabric 226a1 is installed vertically on side 251 and permeable filter fabric 226a2 is installed vertically on side 252 of a trench 250 and aggregate 208 is installed over a horizontally arranged layer of HPMM 206 installed over a lower elevation level layer of aggregate 208' or a plurality of layers of aggregates 208" The lower elevation level layer of aggregate 208' or the plurality of layers of aggregates 208" are installed over bottom 253 of the trench 250. Stormwater flow runoff 10 from paved area P flows toward vegetated or grassy buffer strip G that at least partially forms sidewall 252 of the trench 250. The stormwater runoff 10 then enters the upper level aggregate 208. Barrier B at least partially forms sidewall 251 of the trench 250. The stormwater runoff 10 then travels vertically downward towards the horizontally arranged layer of HPMM 206 where removal of nitrogen and phosphorous and metals occurs in the same manner as described above with respect to FIGS. 2A1 through 2E.

Figure 2G:
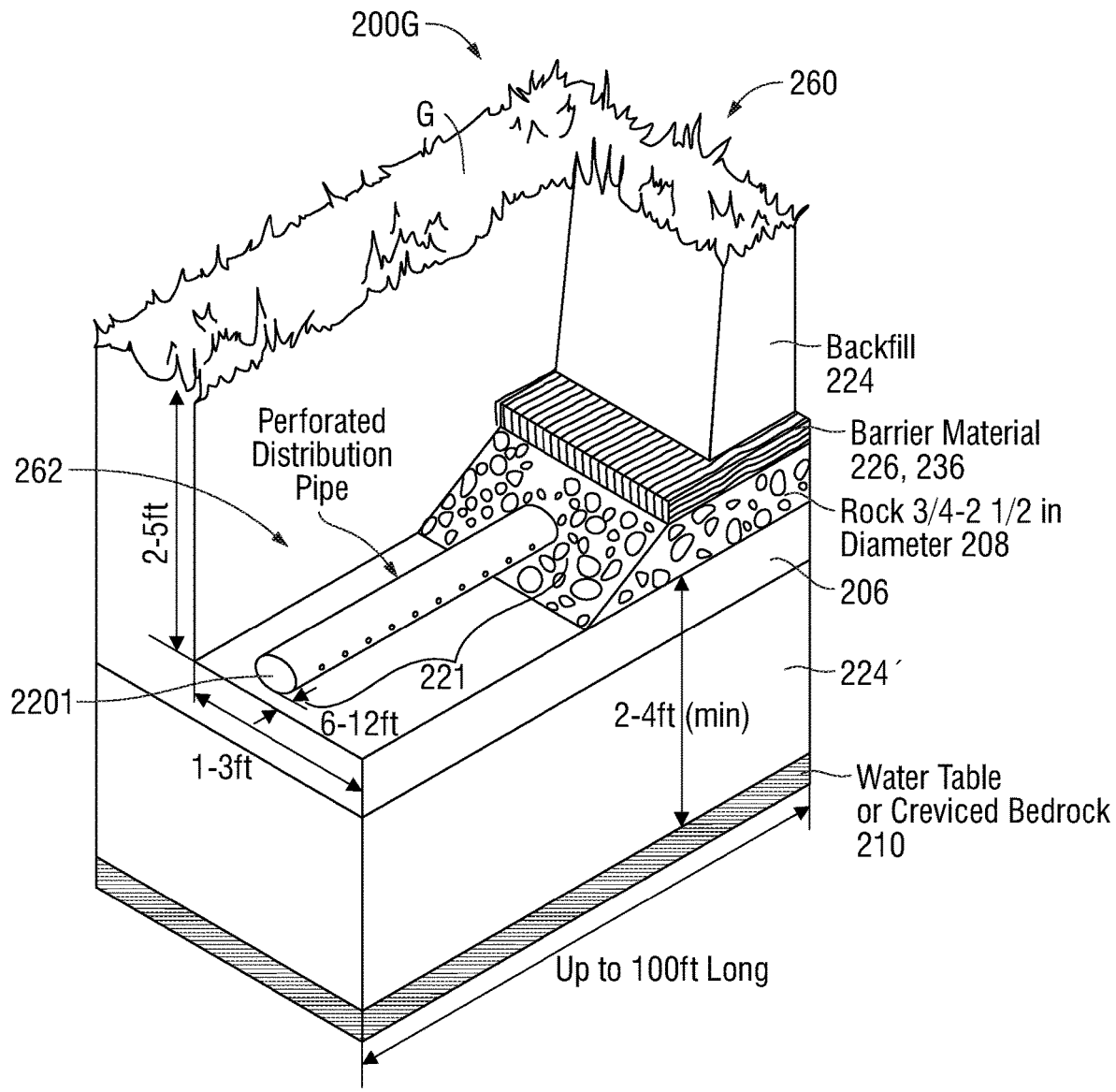
FIG. 2G is an installation diagram for still another method of installing or using the HPMM according to embodiments of the present disclosure in a septic system wherein soil is installed over a geotextile installed over pipe and/or aggregate, or septic chambers forming a leach field trench and further over a horizontally arranged layer of HPPM.

FIG. 2G is an installation diagram for still another method 200G of installing or using the HPMM according to embodiments of the present disclosure in a septic system leach field 260 having a grassy upper surface G wherein soil 224 is installed as backfill over a fabric 226 installed and over a perforated distribution pipe 2201 and aggregate 208, and further over a horizontally arranged layer of HPPM 206 resting on a lower level of soil 224'. Wastewater from a septic tank (not shown) travels along the perforated distribution pipe 2201 and travels vertically downward through aggregate 208 through the horizontally arranged layer of HPPM 206 where levels of nitrogen and phosphorous are reduced by the HPMM and then through the lower level of soil 224' to the water table 210.

Alternately, septic chambers (not shown) (available from Infiltrator Water Technologies, Inc., Old Saybrook, Conn., USA) can be used in lieu of the distribution pipe 2201. The HPMM may also be placed in a septic filter, elevated sand mounds, at-grade systems, shallow placed pressure dosing systems, and recirculating sand filters (not shown).

The dimensions illustrated in FIG. 2G are merely by way of example and are not specifically required for any person skilled in the art to implement the method 200G of installing or using the HPMM 206 and may be varied as required or desired for site-specific installation or field requirements.

The foregoing methods 200A1-200G are merely examples of the numerous and various ways in which the HPMM 206 or 206' may be installed or used. In view of and having the benefit of the present disclosure, those skilled in the art will recognize other ways of manufacturing, applying and using the HPMM 206 or 206' that fall within the scope of the present disclosure.

Figure 3A:
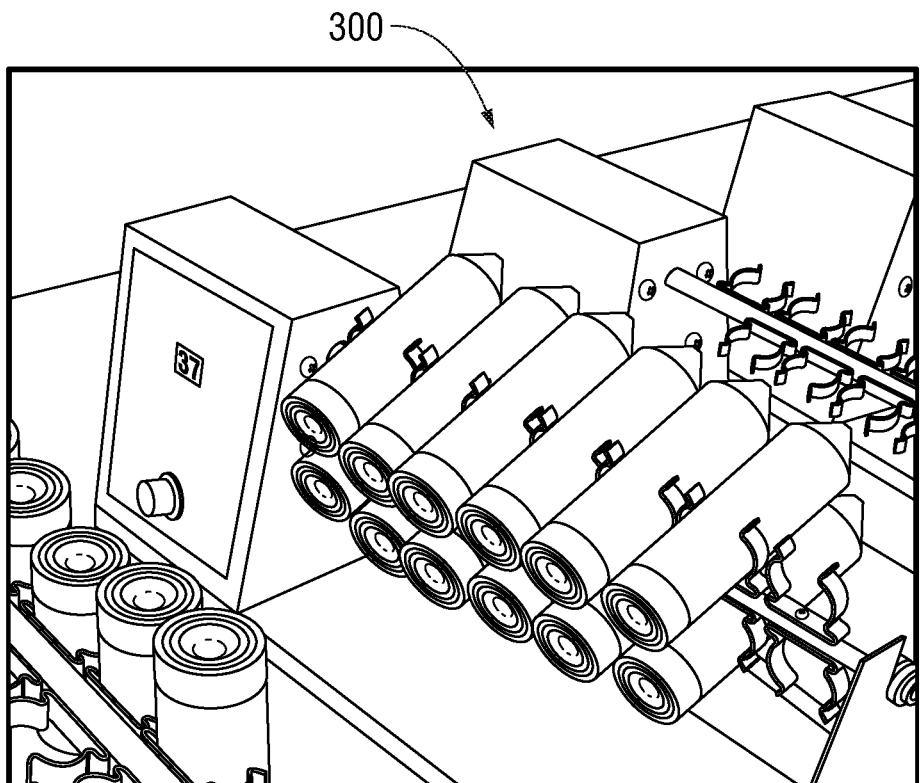
FIG. 3A illustrates materials screening sample test tubes and a tabular listing of materials screening test protocols for batch adsorption equilibrium.

FIG. 3A illustrates materials screening sample test tubes 300 and a tabular listing of materials screening test protocols for batch adsorption equilibrium. To study batch adsorption equilibrium, samples of 1 g or less of material in 50 mL solutions of 0.0-10.0 mg/L P and 0.01 M NaCl are utilized. The samples are shaken end-over-end for 24 hours, after which time equilibrium TDP concentrations are measured according to SM 4500-P.

Figure 3B:
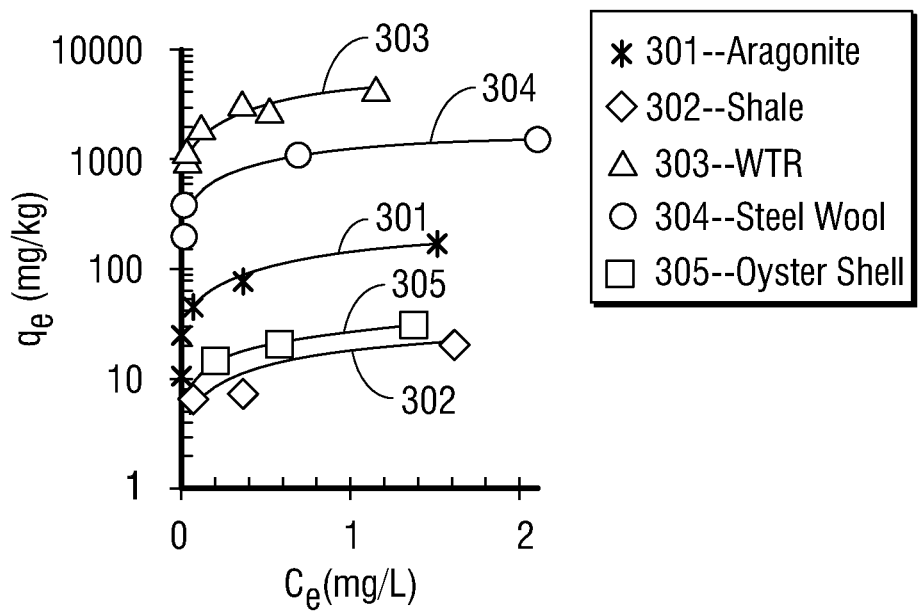
FIG. 3B illustrates a plot of batch test results in the form of a plot of adsorption capacity of aluminum-based water treatment residual (WTR) of approximately 2037 mg/kg for various materials and a tabular listing of results.

FIG. 3B illustrates a plot of the batch test results in the form of a plot of adsorption capacity of aluminum-based water treatment residual (WTR) of approximately 2037 mg/kg for various materials and a tabular listing of results. Plots of adsorption capacity qe (mg/kg) versus equilibrium concentration Ce (mg/L) are illustrated for aragonite 301, shale 302, WTR 303, steel wool 304 and oyster shell 305. The adsorption capacity qe of aluminum-based water treatment residual (WTR) of approximately 2037 mg/kg was the highest recorded during the testing.

Figure 3C:
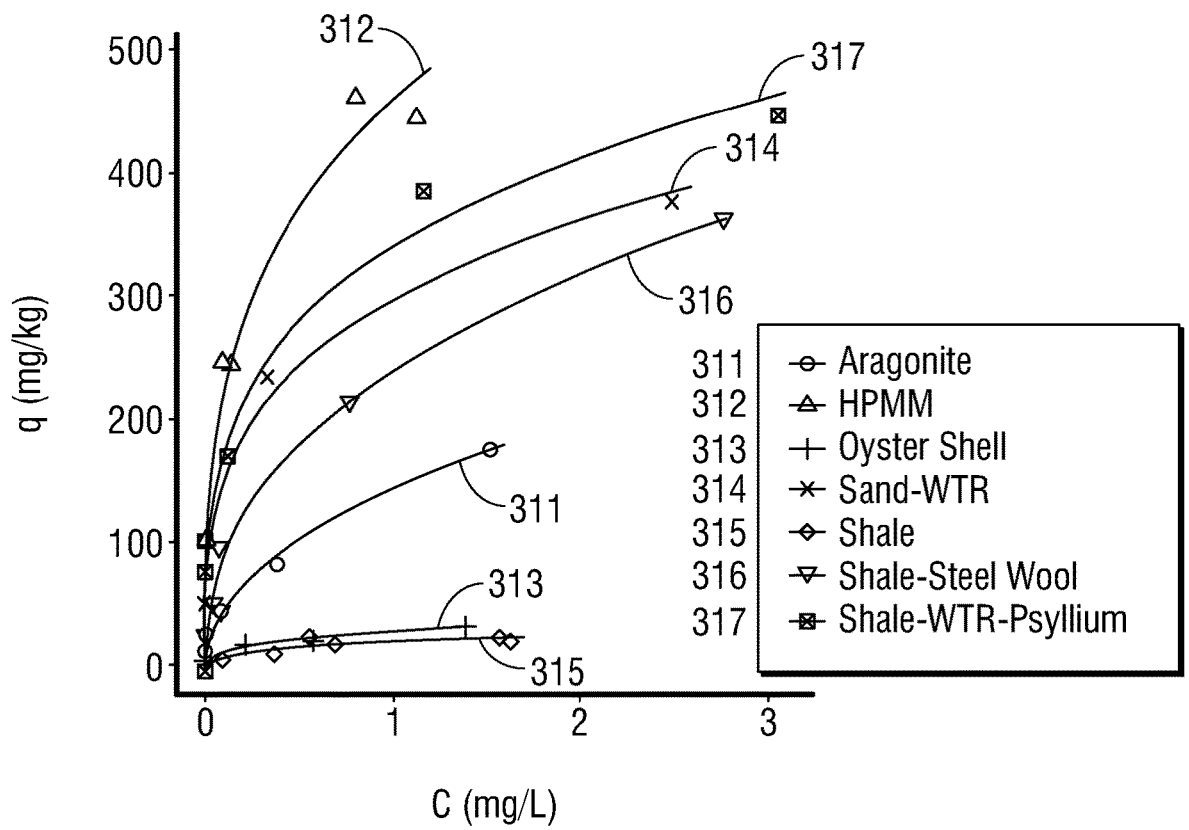
FIG. 3C illustrates a plot of batch test results in the form of a plot of adsorption capacity of aluminum-based water treatment residual (WTR) of approximately 260 mg/kg for various materials and a tabular listing of results.

FIG. 3C illustrates a plot of batch test results in the form of a plot of adsorption capacity of HPMM of approximately 260 mg/kg for various materials and a tabular listing of results. Plots of adsorption capacity q (mg/kg) versus concentration (mg/L) are illustrated for aragonite 311, HPMM 312, oyster shell 313, sand WTR 314, shale 315, shale-steel wook 316 and shale WTR-*psyllium* 317.

Note that the shale WTR-*psyllium* 317 composition was similar to HPMM 312 but the *psyllium* was obtained from a different manufacturer.

For the HPMM 312, stabilizer soil binder (available from Stabilizer Solutions, Phoenix, Ariz., USA) was employed as the source of *psyllium*. It should be noted that different results can be expected depending on the manufacturer. The results indicate the HPMM 312 performed the best with an adsorption capacity qe of approximately 260 mg/kg at a concentration Ce of 0.20 mg/L.

Although as noted shale WTR-*psyllium* 317 was similar in composition to HPMM 312, shale WTR-*psyllium* 317, while still outperforming the other materials, did not achieve the same level of adsorption capacity as that of HPMM 312.

Figure 4:
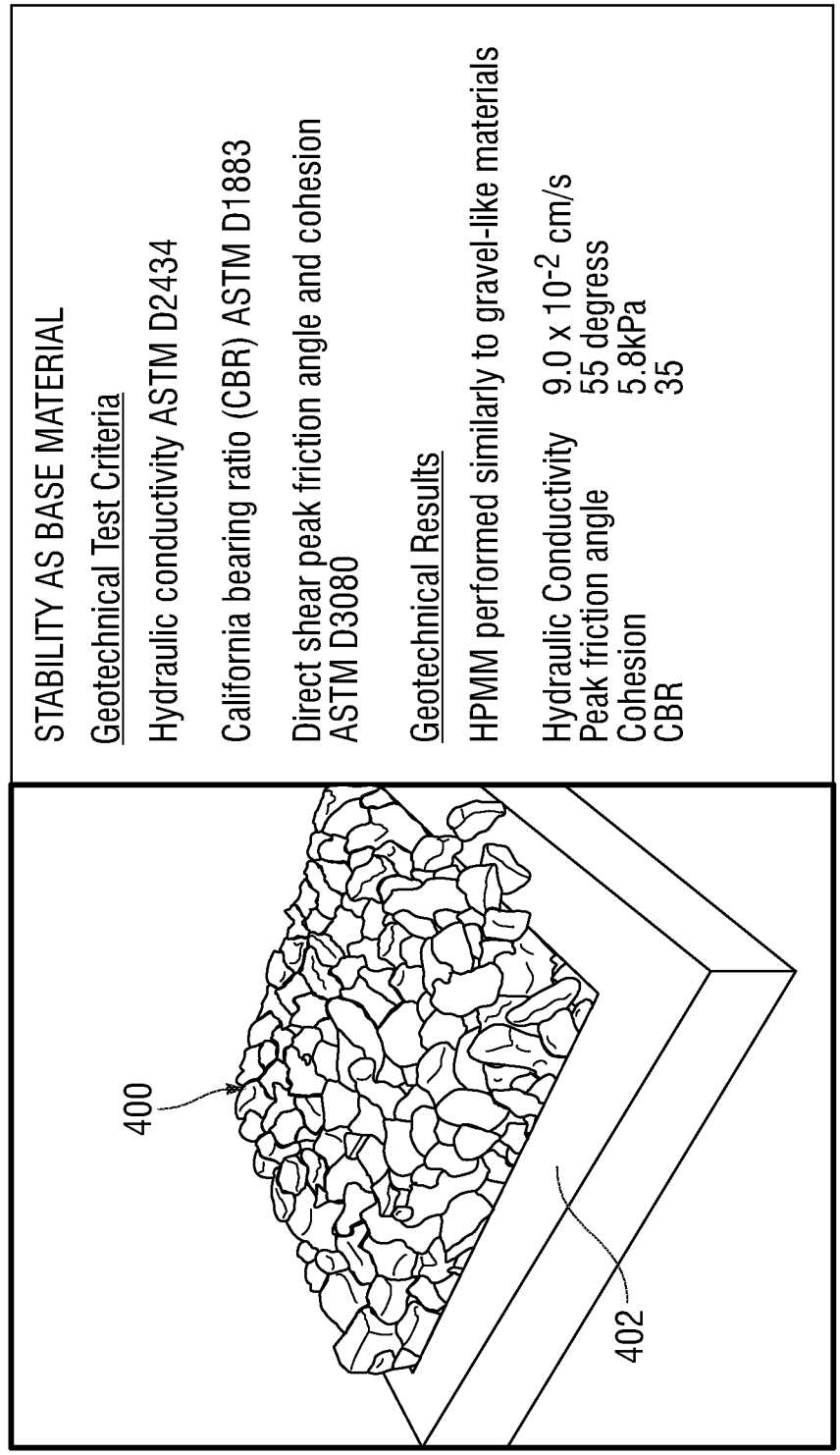
FIG. 4 illustrates the HPPM in a tray prior to testing stability as a base material and including a listing of geotechnical test criteria and geotechnical results.

FIG. 4 illustrates HPPM 400 in a shear box 402 prior to testing stability as a base material and including a listing of geotechnical test criteria and geotechnical results. The geotechnical test criteria included (a) hydraulic conductivity according to ASTM D2434, (b) California bearing ratio (CBR) according to ASTM D1883, and (c) direct shear peak friction angle and cohesion according to ASTM D3080.

The geotechnical test results indicated that the HPMM 400 performed similarly to gravel-like materials with (a) hydraulic conductivity of $9.0 \times 10^{-2}$ cm/s, (b) peak friction angle of 55 degrees, (c) cohesion of 5.8 kPa, and (d) CBR of 35.

Figure 5A:
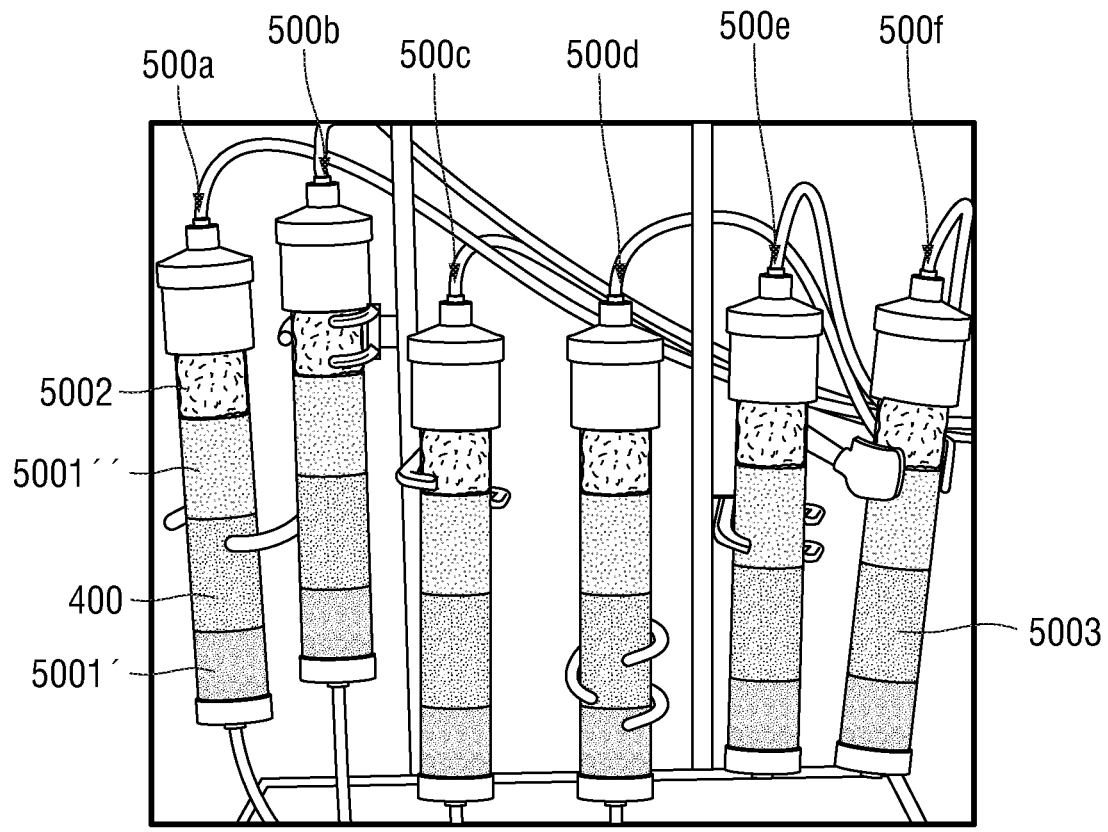
FIG. 5A illustrates a plurality of glass columns containing 5 cm of HPMM for testing of long-term phosphorous retention and a tabular listing of continual loading test criteria for the columns.

FIG. 5A illustrates a plurality of glass columns containing 5 cm of HPMM or shale for testing of long-term phosphorous retention and a tabular listing of continual loading test criteria for the columns. More particularly, column 500a contained a first sample of HPMM 206, column 500b contained a second sample of HPMM 400 and column 500c contained a third sample of HPMM 400. Referring to column 500a as an example, each column included a lower layer 5001' of silica sand under HPMM 206 and an upper layer 5001" of silica sand over HPMM 206 and glass wool 5002 over the upper layer 5001" of silica sand.

Column 500d contained a first sample of shale, column 500e contained a second sample of shale, and column 500f contained a third sample of shale 5003. Columns 500d to 500f similarly included silica sand and glass wool as described above with respect to columns 500a to 500c.

As indicated above, the continual loading test criteria included filling the 2.5 cm internal diameter (ID) columns 500a-500f with, from bottom to top, approximately 4 cm silica sand as lower layer 5001', 5 cm of HPMM 400 or shale 5003 another approximately 4 cm silica sand as upper layer 5001", and enough glass wool to fill the remaining space. The silica sand and glass wool served to hold the HPMM 400 and shale 5003 in place during the testing. The columns were then subjected to synthetic stormwater concentration of 0.17 mg/L phosphorous and 0.01 M of NaCl at a flow rate of 15 cm/hour.

Figure 5B:
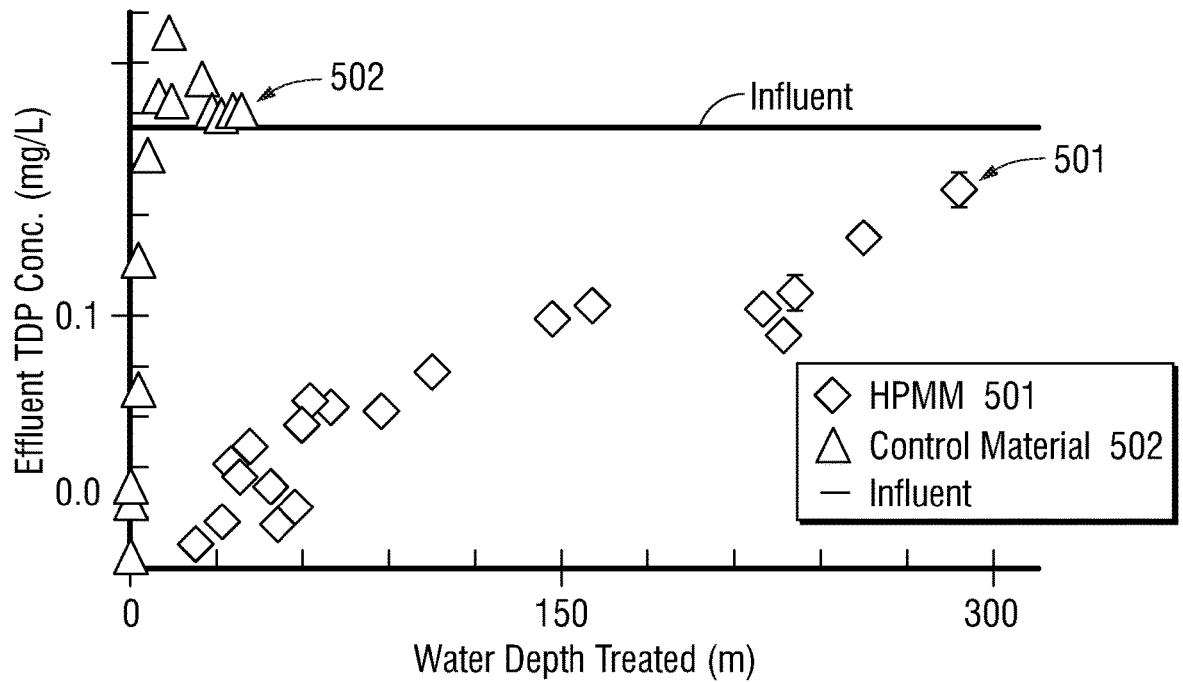
FIG. 5B illustrates a graphical plot of effluent total dissolved phosphorous (TDPP concentration versus water depth for HPMM and a control influent and a tabular listing of test results for the columns.

FIG. 5B illustrates a graphical plot of effluent total dissolved phosphorous (TDP) concentration in mg/L versus treated water depth in meters (m) for HPMM 501 and a control material (shale only) 502 and a tabular listing of test results for the columns.

The results indicate that P adsorption capacity was 1276 mg/kg at saturation with 0.17 mg/L P after greater than 300 m of applied water for the HPMM 501. This result is greater than 200 times the capacity of the control material (shale only) 502 and indicates greater than 90% P removal for 25 year pavement design life.

Figure 6A:
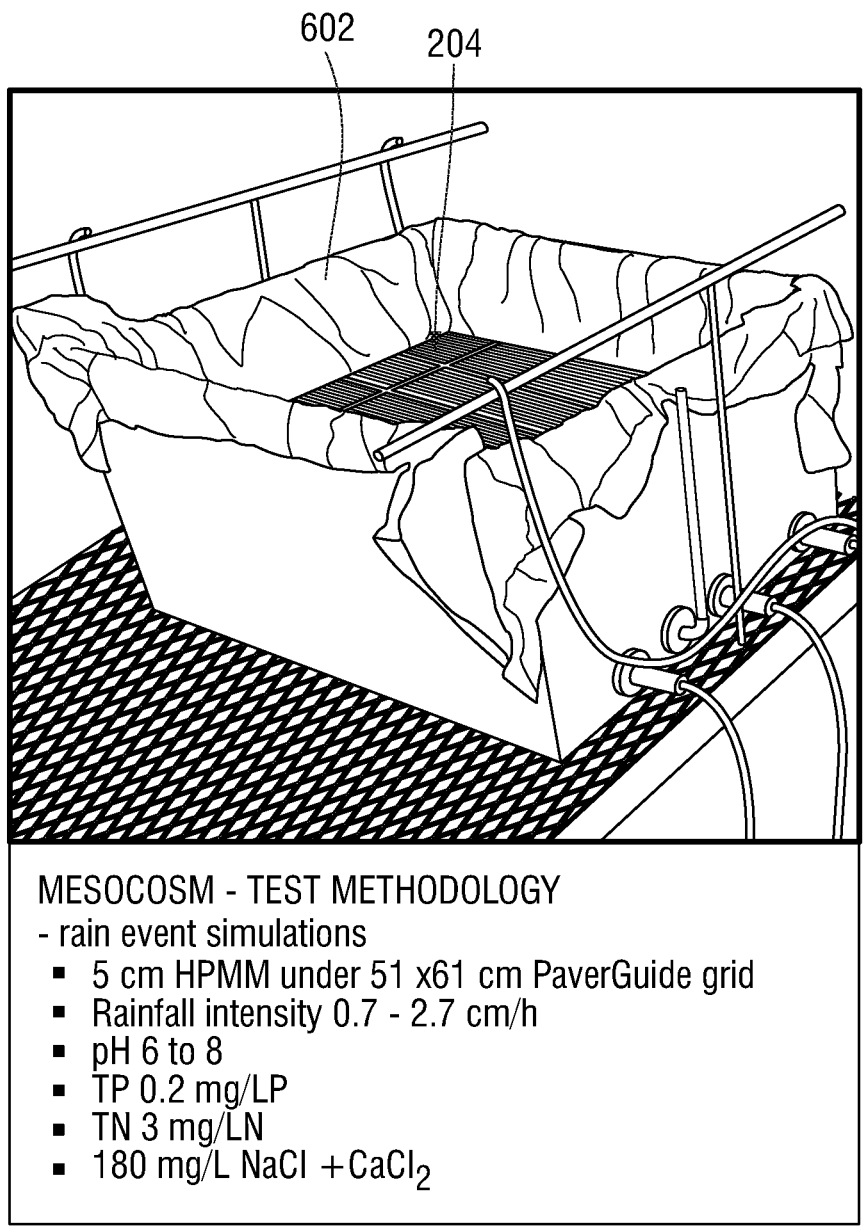
FIG. 6A illustrates the HPMM in a container for mesocosm test simulations of rain events and a tabular listing of the mesocosm test methodology test parameters.

FIG. 6A illustrates structural module 204 in the form of 51×61 cm PaverGuide™ grid is positioned under of 5 cm of HPMM 400 (not shown) under the structural module 204 in a container 602 for mesocosm test simulations of rain events and a tabular listing of the mesocosm test methodology test parameters. The mesocosm test methodology for rain event simulations included 5 cm HPMM 600 under 51×61 cm PaverGuide™ grid (structural module 204). The simulated rainfall intensity ranged from 0.7-24 cm/h.

The pH ranged from 6 to 8.

Total phosphorous (TP) content was 0.2 mg/L P and the total nitrogen (TN) content was 3 mg/L N.

Salt content was 180 mg/L NaCl+CaCl2

FIG. 6B1 is a graphical plot of stormwater effluent TDP in mg/L P versus pH for four different mesocosm rainfall intensity event levels: rainfall intensity level 601 at 0.7 cm/hour; rainfall intensity level 602 at 1.5 cm/hour; rainfall intensity level 603 at 2.0 cm/hour; and rainfall intensity level 604 at 2.7 cm/hour. The 129 storm simulations were treated with a 5 cm media layer. Influent TDP concentrations ranged from 0.19 to 0.29 mg/L as P.

Using a 5 cm deep layer of the media in mesocosm-scale rainfall simulations, a mean effluent dissolved P concentration of 0.05 mg/L was achieved for an influent concentration of 0.19 mg/L, pH 7.0, and rainfall intensity of 1.4 cm/h. These conditions are representative of runoff from a 5-year recurrence interval (RI) storm with 6 h duration in College Park, Md. (Bonnin et al. 2006). At a lower rainfall intensity of 0.7 cm/h, slightly less than the 1-year RI storm, and pH 6.0, an effluent dissolved P concentration at the detection limit of 0.01 mg/L was achieved.

The relationship of rainfall intensity and pH to P removal using the media was explored through a plug flow model fitted to data from 9 such storm simulations. The results illustrated in FIG. 6B1 showed effluent dissolved P concentration to increase with increasing rainfall intensity and pH. FIG. 6B2 is a tabular listing of the adsorption kinetics test results from the mesocosm testing.

Effluent mean concentration (EMC) of TDP ranged 0.03 to 0.15 mg/L P.

Phosphorous removal decreased at higher pH and rainfall intensity. The pH dependence supports P adsorption as the removal mechanism.

EMCs were below 0.05 mg/L P for rainfall intensity below 1.50 cm/h, nearly double the 1-yr storm rainfall intensity in Maryland.

The mixture has also been shown to effectively and consistently remove heavy metal s.

FIG. 6C is a graphical plot of adsorption kinetics test mesocosm test results for copper and zinc in terms of concentration in μg/L for influent 611 versus effluent 612.

The mean influent (n=8) and effluent (n=24) concentrations for Cu and Zn in μg/are the results from 9 storm simulations treating synthetic stormwater with a 5 cm media layer. Influent pH ranged 5.93-8.02 and rainfall intensity ranged 1.38-2.87 cm/h for the simulations.

The results indicate that HPMM removed heavy metals such as copper and zinc reducing the level of Cu from approximately 70 μg/L for influent 611 to approximately 25 μg/L for effluent 612. HPMM reduced the level of Zn from approximately 210 μg/L for influent 611 to approximately 70 μg/L for effluent 612. For 9 storm simulations using spiked influent, copper and zinc effluent concentrations averaged 28 and 76 μg/L, respectively, reduced from mean influent concentrations of 74 and 241 μg/L Aluminum leaching was shown to be minimal under conditions representative of stormwater runoff, with effluent concentrations consistently below 25 μg/L.

FIG. 6D is a tabular illustration of the phosphorous removal equation model based on the mesocosm testing.

A steady state, plug flow model predicts P removal as a function of HPMM depth (d), intensity (i), and pH:

$$\frac{C}{C_0} = e^{-(1.0646-0.0927pH)\frac{d}{i}}$$

where C=effluent TDP concentration (mg/L), $C_0$=influent TDP concentration (mg/L), d=media depth (cm), and i=rainfall intensity (cm/h).

Calibration of the mesocosm testing model is indicated in FIG. 6D1 which is a plot of modeled TDP effluent mean concentration (EMC) in mg/L versus measured TDP EMC in mg/L. pH and in FIG. 6D2 which is a plot of TDP effluent mean concentration (EMC) in mg/L versus rainfall intensity (cm/h).

R2 is the coefficient of determination and is a description of the model (line) fit to the data. A coefficient of determination R2=1.00 is indicative of a perfect fit while a coefficient of determination R2=0.00 is indicative of no fit.

In FIG. 6D1, R2=0.8722 indicates very good agreement between the data and the model.

Model prediction is illustrated in FIG. 6D2 which is a graphical plot of Target Effluent P Concentration (mg/L) versus required media depth (cm) for 1 year (621), 2 year (622) and 10 year (623) durations for the mesocosm testing. This plot is based on the phosphorous removal equation provided in FIG. 6D for the media at storm frequencies corresponding to rainfall intensities of 0.8, 1.0, and 1.4 cm/h. Assumptions include: C0=0.20 mg/L, pH=7, duration=6 h, location=College Park, Md.

This model can inform design decisions for permeable paving installations using the media as a base material. With reference to FIG. 6D2, a designer may select a target effluent TDP concentration on the y-axis (e.g., 0.05 mg/L) and follow to the right until intersecting the curve of the design storm frequency (e.g., 10-yr RI). The required media depth to meet these conditions may then be read from the x-axis (e.g., ~4.5 cm). It should be noted that the storms shown in FIG. 6D2 represent relatively extreme storm events with likelihood of occurring once every 1, 2, and 10 years. These storm recurrence intervals are selected to illustrate the treatment capacity at rainfall intensities at the upper end of the expected range. From a water quality perspective, the majority of rainfall volume, at least two thirds, would be expected to be generated from storms with lower intensity than the 1-yr, 0.8 cm/h intensity storm (Kreeb 2003).

In summary, HPMM is a synthesized retention media mixture for use in removing contaminants in stormwater runoff or other remediation or wastewater treatment applications. HPMM includes expanded shale (shale) in combination with aluminum-based water treatment residual (WTR) bound together with a *psyllium*-based soil stabilizer (*psyllium*). Alternately HPPM may include aggregate, WTR with or without other granular adsorbing materials, and *psyllium*. Although shale of ⅜" (9.51 mm) size has been used with dried and powdered WTR, the novel features of the present disclosure include application of WTR in a mixture with expanded shale bound using powdered *psyllium* for water treatment. Alternately WTR and/or granular adsorbing material may be adhered to an aggregate with the binding agent, *psyllium*. Binding by the *psyllium* of the WTR and/or other adsorbing material to an aggregate (shale, expanded clay, expanded slate, zeolite, slag, stone, etc. enables application of the HPMM without a structure (concrete vault, etc.), to contain the WTR and/or other granular adsorbing material as a structural sub base in a pavement, or in an infiltration trench. If not bound by the *psyllium* the WTR would erode due to the flow of stormwater or wastewater, or its small size would prevent the flow of stormwater or wastewater through it.

The HPMM has been proven to effectively remove dissolved P at laboratory and mesocosm scales under simulated stormwater conditions. With the example provided above with respect to FIG. 6B1, continuous loading with a synthetic stormwater solution containing an average dissolved P concentration of 0.19 mg/L P, typical of stormwater dissolved P concentrations, yielded an adsorption capacity of 1164 mg/kg, compared to 128 mg/kg capacity for shale alone. Assuming an annual rainfall of 100 cm per year, this mixture is predicted to last over 600 years as a permeable pavement sub-base before reaching P saturation at this influent concentration. This is a substantial improvement over the 6-year lifetime predicted using expanded shale alone and enables a long period of use before replacement is needed.

While several embodiments and methodologies of the present disclosure have been described and shown in the drawings, it is not intended that the present disclosure be limited thereto, as it is intended that the present disclosure be as broad in scope as the art will allow and that the specification be read likewise. Therefore, the above description should not be construed as limiting, but merely as exemplifications of particular embodiments and methodologies. Those skilled in the art will envision other modifications within the scope of the claims appended hereto.

REFERENCES

Bonnin, G. M., Martin, D., Lin, B., Parzybok, T., Yekta, M., and Riley, D. (2006). "NOAA Atlas 14." U.S. Department of Commerce. National Oceanic and Atmospheric Administration. National Weather Service. Silver Spring, Md.

Calheiros, C. S. C., Duque, A. F., Moura, A., Henriques, I. S., Correia, A., Rangel, A. O. S. S., and Castro, P. M. L. (2009). "Substrate effect on bacterial communities from constructed wetlands planted with *Typha latifolia* treating industrial wastewater." *Ecological Engineering*, 35(5), 744-753.

Ippolito, J. A., Barbarick, K. A., and Elliott, H. A. (2011). "Drinking Water Treatment Residuals: A Review of Recent Uses." *Journal of Environmental Quality*, 40(1).

Kreeb, L. B. (2003). "Hydrologic Efficiency and Design Sensitivity of Bioretention Facilities.", University of Maryland, College Park, Md.

Sample, D. J., Grizzard, T. J., Sansalone, J., Davis, A. P., Roseen, R. M., and Walker, J. (2012). "Assessing performance of manufactured treatment devices for the removal of phosphorus from urban stormwater." *Journal of Environmental Management*, 113, 279-291.

Stumm, W., and Morgan, J. J. (1996). *Aquatic chemistry: Chemical equilibria and rates in natural waters*, Wiley, New York.

What is claimed is:

1. A retention media for removing substances from water, comprising:
    an aggregate selected from the group consisting of expanded shale, expanded clay, expanded slate, stone, zeolite, slag, and combinations thereof;
    at least one adsorbing material capable of adsorbing nutrients and metals; wherein the at least one adsorbing material comprises a material having a chemical composition enabling the at least one adsorbing material to act through one of ligand exchange or ion exchange or hydrogen bonding or hydrophobic partitioning or combinations thereof; and
    psyllium, as a binding material, wherein the binding material acts as a binder to adhere the at least one adsorbing material to the aggregate to form a high permeability media mix
    wherein the at least one adsorbing material is selected from the group consisting of water treatment residual (WTR), zeolite, activated carbon, aluminum-containing adsorbent compounds, iron-containing adsorbent compounds, and combinations thereof.

2. The retention media according to claim 1 wherein the *psyllium*, when activated by water, forms a gelatinous mass which acts as a binder to adhere the at least one adsorbing material to the aggregate.

3. The retention media according to claim 2, wherein the content of the *psyllium* is 0.8%-1.2%.

4. The retention media of claim 2, wherein the aggregate, the at least one adsorbing material, the *psyllium*, and the water are mixed by hand or in a device capable of blending the retention media.

5. The retention media of claim 4, further comprising a permeable pavement surface located above said retention media, wherein said retention media is configured to remove substances from water that enters said retention media through said permeable pavement surface.

6. The retention media of claim 4, wherein the retention media is placed in an infiltration trench exposed to meteorological events to remove substances from water.

7. The retention media according to claim 1, wherein the aggregate is expanded shale, and the at least one adsorbing material is an aluminum-containing absorbent compound.

8. The retention media of claim 7, wherein the at least one adsorbing material includes iron.

9. The retention media according to claim 1, wherein the aggregate is expanded shale, the at least one adsorbing material is water treatment residual, and the binding material is *psyllium*.

10. The retention media according to claim 9, wherein the at least one adsorbing material includes activated carbon.

11. The retention media according to claim 9, wherein the at least one adsorbing material includes zeolite.

12. The retention media according to claim 9, wherein content of the WTR is 5%-15%.

13. The retention media according to claim 9, wherein *psyllium* content is 0.8%-1.2%.

14. The retention media according to claim 1, wherein the at least one adsorbing material is a material having a chemical composition enabling the at least one adsorbing material to remove from water one of phosphorous species or nitrogen species or heavy metals or combinations thereof.

15. The retention media of claim 1, wherein the aluminum-containing adsorbent compounds are selected from alum, aluminum oxides, aluminum hydroxides, aluminum chlorides, or combinations thereof.

* * * * *